(12) United States Patent
Gill

(10) Patent No.: US 7,828,335 B2
(45) Date of Patent: Nov. 9, 2010

(54) INTERCHANGEABLE PIPE COUPLING

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 819 days.

(21) Appl. No.: 11/445,683

(22) Filed: Jun. 1, 2006

(65) Prior Publication Data

US 2006/0220381 A1 Oct. 5, 2006

Related U.S. Application Data

(63) Continuation-in-part of application No. 11/113,256, filed on Apr. 22, 2005, now abandoned, which is a continuation-in-part of application No. 11/077,091, filed on Mar. 10, 2005, now abandoned, which is a continuation-in-part of application No. 10/665,089, filed on Sep. 17, 2003, now abandoned, which is a continuation-in-part of application No. 10/654,666, filed on Sep. 4, 2003, now Pat. No. 7,036,850.

(51) Int. Cl.
*F16L 37/18* (2006.01)

(52) U.S. Cl. .......................................... 285/314; 285/34

(58) Field of Classification Search .................. 28/305, 28/383, 112, 110, 314, 320, 307, 308; 285/305, 285/383, 112, 110, 314, 320, 307, 308, 34, 285/71, 73
See application file for complete search history.

(56) References Cited

U.S. PATENT DOCUMENTS

| 37,751 | A | 2/1863 | Jucket | |
|---|---|---|---|---|
| 114,575 | A | 5/1871 | Lovell | |
| 464,386 | A | 12/1891 | Patterson | |
| 527,764 | A | 10/1894 | Bichet et al. | |
| 558,364 | A | 4/1896 | Doolittle | |
| 592,899 | A | 11/1897 | Wilson | |
| 909,790 | A | 1/1909 | Hebert | |
| 969,019 | A | 8/1910 | Wilson et al. | |
| 983,671 | A * | 2/1911 | Boesch | 285/73 |
| 1,006,190 | A * | 10/1911 | Estell et al | 285/34 |
| 1,029,819 | A | 6/1912 | Nylander | |
| 1,096,690 | A | 5/1914 | Derbyshire | |
| 1,916,284 | A * | 7/1933 | Ragan | 285/35 |

(Continued)

OTHER PUBLICATIONS

CertainTeed Corporation Pipe and Plastics Group, "Certa-Lok PVC Drop Pipe for Submersible Pumps" product brochure, 1992, USA.

*Primary Examiner*—Aaron M Dunwoody
(74) *Attorney, Agent, or Firm*—Thorpe North & Western LLP

(57) ABSTRACT

A coupling to connect pipe, including lengths of pipe, valves, hoses, and pipe and hose fittings, includes a body having an opening to closely receive the end portion of the pipe to be coupled. One embodiment of the coupling includes an end having a grooved end portion extending partially around the receiving opening with an internal groove therein and a recessed end portion extending partially around the opening and interrupting the internal groove, the end face of the coupling body being stepped and defined by both the grooved end portion and the recessed end portion. Jaw members move between a position to allow the pipe to move into or out of the coupling body and a position securing the pipe in the coupling body. An insert may be provided to lock the jaw members in position.

15 Claims, 30 Drawing Sheets

U.S. PATENT DOCUMENTS

Figure 1:
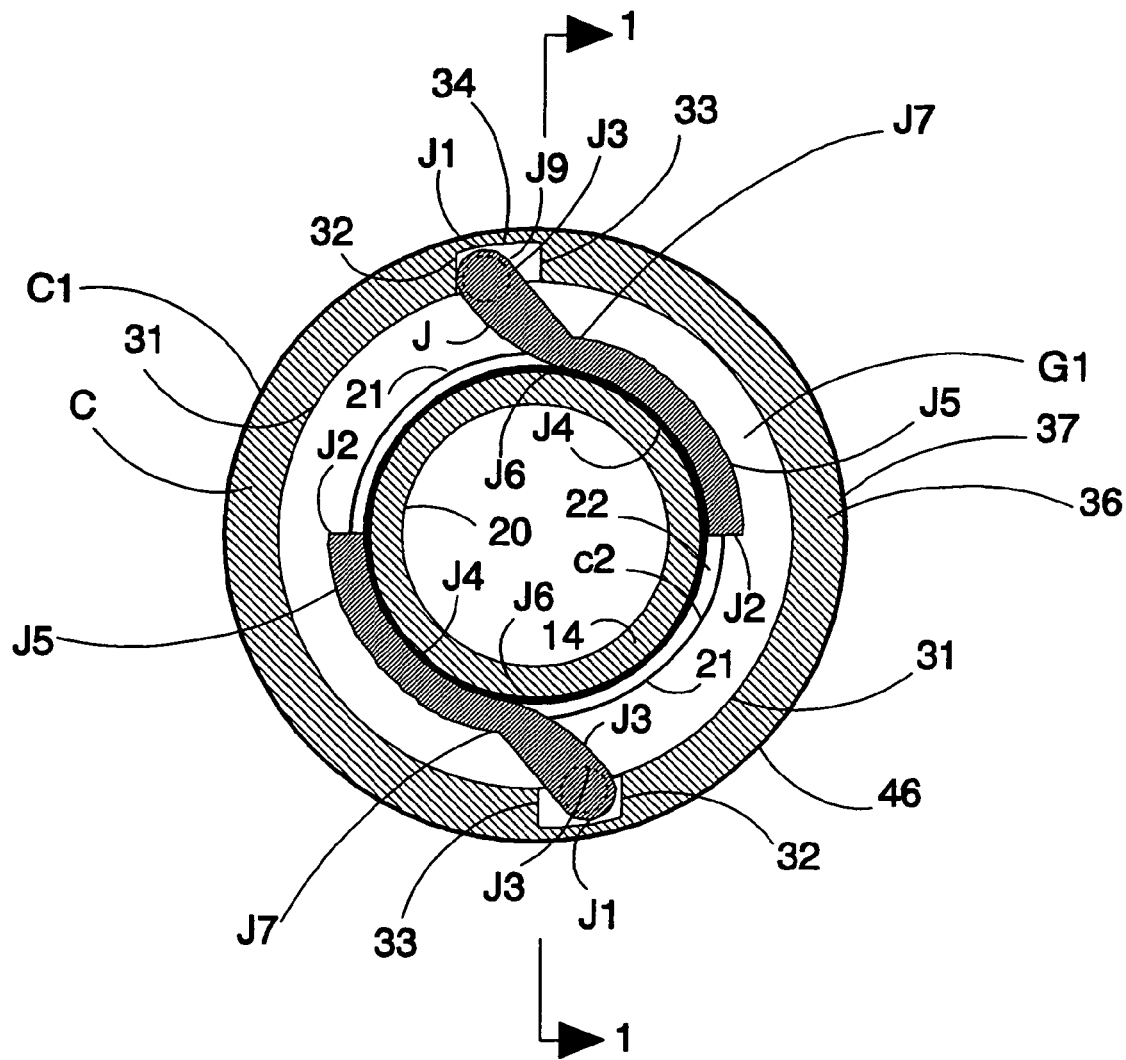

| | | |
|---|---|---|
| 1,996,287 A | 4/1935 | Fisher |
| 2,102,774 A | 12/1937 | Williams |
| 2,369,770 A | 2/1945 | Baxter |
| 2,493,577 A | 1/1950 | Franklin |
| 2,509,671 A | 5/1950 | Christensen |
| 2,722,399 A | 11/1955 | Oetiker |
| 3,104,896 A | 9/1963 | Kennedy, Jr. |
| 3,229,997 A | 1/1966 | Simpson et al. |
| 3,345,087 A | 10/1967 | Hanes et al. |
| 3,642,249 A | 2/1972 | Cruse |
| 3,827,728 A | 8/1974 | Hynes |
| 4,049,018 A | 9/1977 | Skibowski |
| 5,149,143 A | 9/1992 | Howell |
| 5,387,017 A | 2/1995 | Gill |
| 5,586,789 A | 12/1996 | Bently |
| 5,707,340 A | 1/1998 | Hipp et al. |
| 5,752,724 A | 5/1998 | Bormioli |
| 5,794,988 A | 8/1998 | Gill |
| 5,868,441 A | 2/1999 | Gill |
| 6,540,263 B1 | 4/2003 | Sausner |

* cited by examiner

SECTION 3-3

SECTION 2-2

SECTION 2-2

SECTION 1-1

SECTION 5-5

SECTION 4-4

SECTION 5-5

SECTION 5-5

SECTION 5-5

INTERCHANGEABLE PIPE COUPLING

RELATED APPLICATIONS

This is a continuation-in-part of application Ser. No. 11/113,256, filed Apr. 22, 2005 now abandoned, entitled Pipe Coupling, which was a continuation-in-part of application Ser. No. 11/077,091, filed Mar. 10, 2005 now abandoned, entitled Pipe Coupling, which was a continuation-in-part of application Ser. No. 10/665,089, filed Sep. 17, 2003 now abandoned, entitled Pipe Coupling, which was a continuation-in-part of application Ser. No. 10/654,666, filed Sep. 4, 2003 now U.S. Pat. No. 7,036,850, also entitled Pipe Coupling.

BACKGROUND OF THE INVENTION

1. Field

The invention is in the field of couplings to connect grooved or plain end portions of pipes, and to connect hoses, valves, pipe fittings, expansion joints, dead ends of pipes, and covers, lids, and bottoms of pressure vessels. The invention also applies to connecting structural piping or other structural members.

2. State of the Art

There are various types of mechanical couplings which employ various radial mechanical means, such as clamps and rings to secure the couplings to circumferential grooves on the ends of two pipes being connected. There are also my couplings, patented under U.S. Pat. Nos. 5,387,017, and 5,868,441, each of which employ a set of camming jaw members mounted on the coupling body around the receiving opening, where, to engage or to disengage, the coupling jaw members move toward or away from a pipe received in the body. There are other couplings shown in U.S. Pat. Nos. 5,794,988, and 6,186,560, by the inventor where expandable rings are employed to engage or to disengage the coupling. The new invented coupling is more economical to produce, and is easier than other couplings to connect plain end pipe. From here on the word pipe will encompass not only lengths of pipe, but also valves, hoses, and pipe and hose fittings where a connection is made to a pipe or other hoses or fittings.

SUMMARY OF INVENTION

According to the invention, a coupling to connect two opposite circumferential end portions of pipe includes a coupling body with a receiving opening therein so that the coupling body closely receives and surrounds the end portion of a pipe to be coupled. The coupling body includes a radial groove therein concentric with the axis of the coupling and a pipe inserted into the coupling, and which groove is positioned over at least a portion of the pipe when the end portion of the pipe is received in the coupling body. One or more jaw member is positioned in the groove and can be moved to a position in the groove with respect to the received pipe to secure the pipe in the coupling body. The jaw member may be a rigid lever jaw member mounted in the coupling so that a portion of the lever jaw member is located inside the radial groove. A portion of the lever jaw member preferably extends to the outside of the coupling body so that the jaw member can be operated from outside the coupling body.

In one embodiment of the invention, the lever jaw member may be a set of lever jaw members which define a first class lever with a power arm and a weight arm. A first class lever has the fulcrum between the effort (the power arm of the lever) and the load (the weight arm of the lever). Thus, a separate power arm of the lever extends from the fulcrum of the lever and a separate weight arm extends from the fulcrum of the lever. By separate arms is meant that the power arm and weight arms are separate arms, although they may be formed by a single length of material with the fulcrum dividing the length of material into the power arm and the weight arm where the two arms have a common portion surrounding the fulcrum. In the embodiment of the invention presently being described, the power arm of each set of lever jaw members is offset from the weight arm of the set of lever jaw members by an axle which forms the fulcrum of the lever. The words fulcrum and an axle will be considered as synonyms when describing this preferred embodiment. A portion of the weight arm furthest away from the fulcrum is arcuate, preferably concentric with a groove in the body of the coupling which accommodates it, which also makes it concentric with the end portion of a pipe to be coupled received in the coupling body receiving opening. The fulcrum axle at the junction of the power and weight arms is located in a gap or opening provided in the end of the coupling where the radial groove is interrupted with an opening from the radial groove to outside the coupling body. In this embodiment, the power arm is situated outside the coupling body and runs approximately parallel to the weight arm situated inside the coupling body. Although the power arm and the weight arm run approximately parallel to one another, since the arms are separate and are joined at the fulcrum, the set of separate arms are considered as forming a first class lever.

The power arm of the lever jaw can be operated by a hand or hand held tool. Rotating the power arm in one direction moves the weight arm toward a pipe end portion received in the coupling body receiving opening, and rotating the power arm in the opposite direction moves the weight arm away from the pipe. Thus, the weight arm is engaged or disengaged with a pipe received in the coupling body receiving opening (the pipe having a plain surface or a groove in its end portion) by rotating the lever jaw about its fulcrum, using the power arm of the lever jaw which is preferably accessible outside the coupling body. The radial groove inside the end portion of the body of the coupling is provided with sufficient depth to accommodate the movement of the weight arm between the engaged and disengaged positions. Further, while the weight arm and power arm are approximately parallel, the arms will be offset slightly to the degree necessary so that the power arm can move the weight arm into engaged position in a groove in the pipe end inserted into the coupling body without the power arm movement being blocked by the pipe extending from the coupling.

The set of lever jaw members may be held in engaged position by arranging the power arm to frictionally engage the outer face of the coupling body. Such friction may be provided in various ways. Frictional engagement may be between the power arm against the coupling end face along its length or a portion of its length or by a friction portion extending from the power arm against the coupling end face. The friction portion may extend from the power arm in the form of a tab or may be a screw threaded through the power arm which can be extended against the coupling body face to provide the friction to hold the power arm in place. A spring loaded ball bearing or similar item on the power arm or the coupling body face may be used to enter a detent in the coupling body face or the power arm to hold the power arm in place. Alternately, a screw could be screwed into an aligned threaded or non-threaded receiving hole in the connector body end face when the power arm is in engaged position to positively lock the power arm in place. Depending upon the situation, it may be necessary or unnecessary to employ locking screws with the coupling when used with grooved or plain end pipe. Alternately, the weight arm can be held in engaged position by a screw extending longitudinally into the radial groove in the coupling body which holds the weight arm in engaged position, or by a bolt extending radially into the radial groove in the coupling body to lock the weight arm in engaged position.

The end portion of the coupling body which includes the groove in which the jaw member is located need not extend completely around the circumference of the pipe, but may extend only partially around the received pipe so the groove extends only partially around the received pipe. In such case the groove opens to outside the coupling body. The lever jaw member may be mounted in this groove, or a flat camming jaw member may be mounted in the groove such that movement of the camming jaw member results in radial movement of the camming jaw member in the groove between a position spaced radially from the pipe to allow the pipe to move into or out of the coupling body and a position in the groove securing the pipe in the coupling body. Alternately, with the groove opening to outside the coupling body, a flat jaw member without camming grooves may be inserted into the groove to secure the pipe in the coupling body or removed from the groove to allow the pipe to be inserted or removed from the coupling body.

In one embodiment of the invention which is particularly adapted for use when the coupling body portion including the radial groove extends only partially around the received pipe, a single lever arm pivoted at one end to the coupling body outside the groove is used rather than the set of lever arms having separate power and weight arms. The single lever arm is operated in the manner of a third class lever with the power applied intermediate the length of the arm.

Various combinations of lever jaw members and flat jaw members, camming or non-camming can be used in the invention. The flat jaw members may include a notch at an end inserted into the groove so that the lever jaw member can be moved into holding position against the pipe end portion received in the coupling and the flat jaw member then slid into position against the pipe end portion with the notch engaging the end of the lever jaw member in the groove and locking it into position.

It has been found that a coupling body of the invention can be standardized to be alternately fitted with lever jaw members, flat jaw members, or a combination of lever and flat jaw members, as desired by a user for particular applications. Mounting holes can be provided in locations to be used for mounting the various different jaw members, or with the mounting holes programmed into automated manufacturing equipment, such as CNC machines, desired holes can be selected at the time of manufacture.

For different applications of the coupling, different types of gaskets are provided between the coupling and pipe end portions. In some applications, conventional "O" rings or other gaskets may be used with the coupling. At least one gasket is provided for the coupling to seal the exit of fluid from the pipes being joined. A predetermined length of gap between the ends of two pipes being joined may be provided to allow for thermal expansion and to maintain the integrity of the gasket seal.

An object of the invention is to provide an interchangeable coupling having a common basic body for interchangeable locking jaw elements to connect grooved end pipe, hoses, valves, dead ends for pressure vessels, and pressurized systems and structural pipe.

Another object of the invention is to provide interchangeable jaws made of arcuate strips.

Another object of the invention is to provide interchangeable jaws made of arcuate strips having end means to lock on the end of a lever jaw.

Another object of the invention is to provide arcuate integral or attached means for the jaws to be easily operated by the force of a human thumb.

Another object of the invention is to provide a common basic body for low or high pressure couplings where for low pressure only one jaw will be required for the coupling.

Another object of the invention is to provide a system of threaded holes or openings in the single face of the coupling body for pins or bolts to position functionally interchangeable locking jaw elements.

Another object of the invention is to provide a mirror image of said system of holes or openings in the opposite face of a two faced coupling.

Another object of this invention is that according to the demand of the customer, any set of holes or openings of the basic common coupling body can be suppressed or unsuppressed, to be manufactured in the manufacturing process of the coupling body, by means of CNC machines.

Yet, another object of the invention is to cut the manufacturing cost of a multipurpose coupling by systematizing the location of the holes or openings in the body of the coupling to accommodate the various combinations of jaws.

THE DRAWINGS

Figure 2:
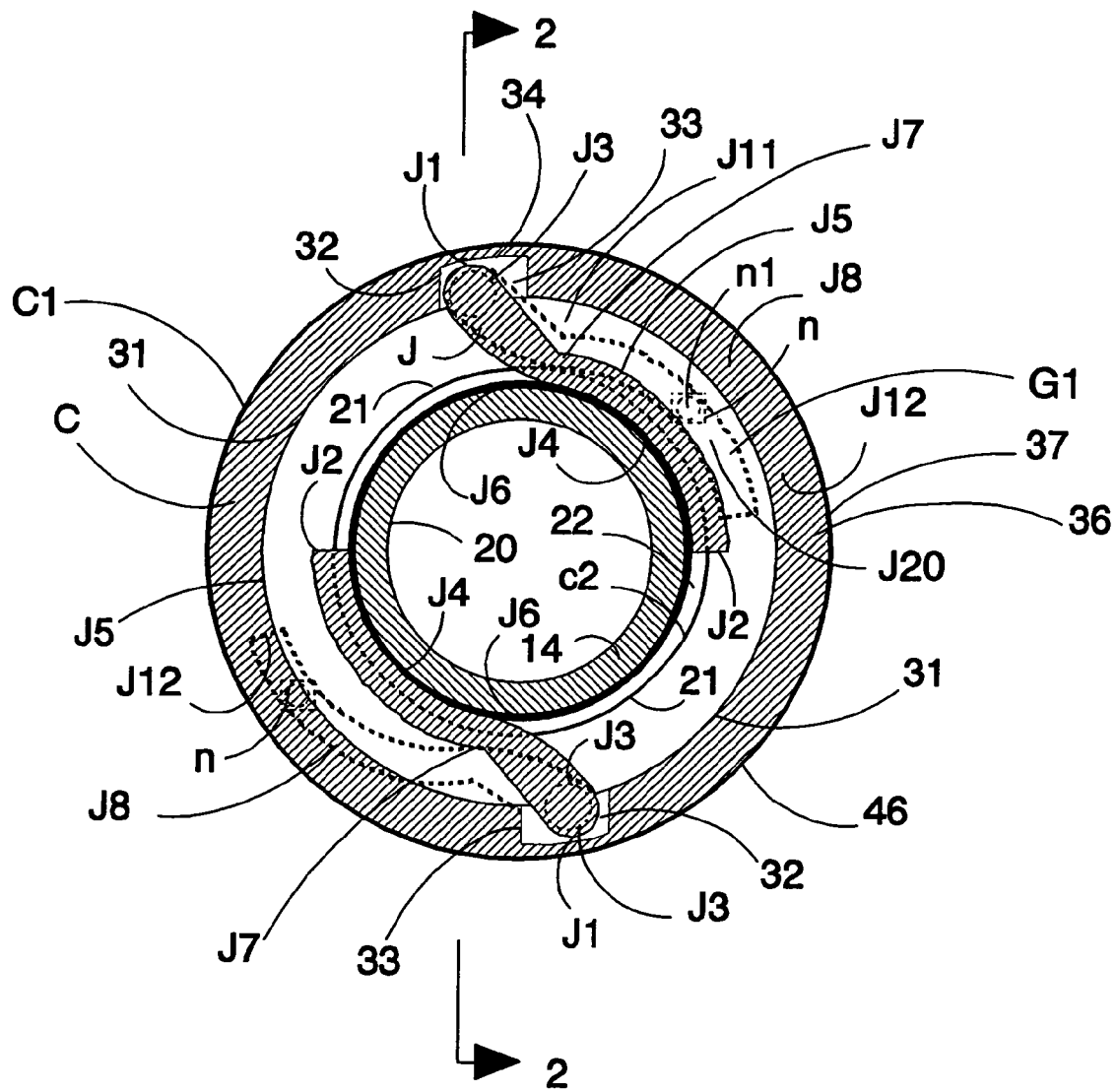
Figure 3:
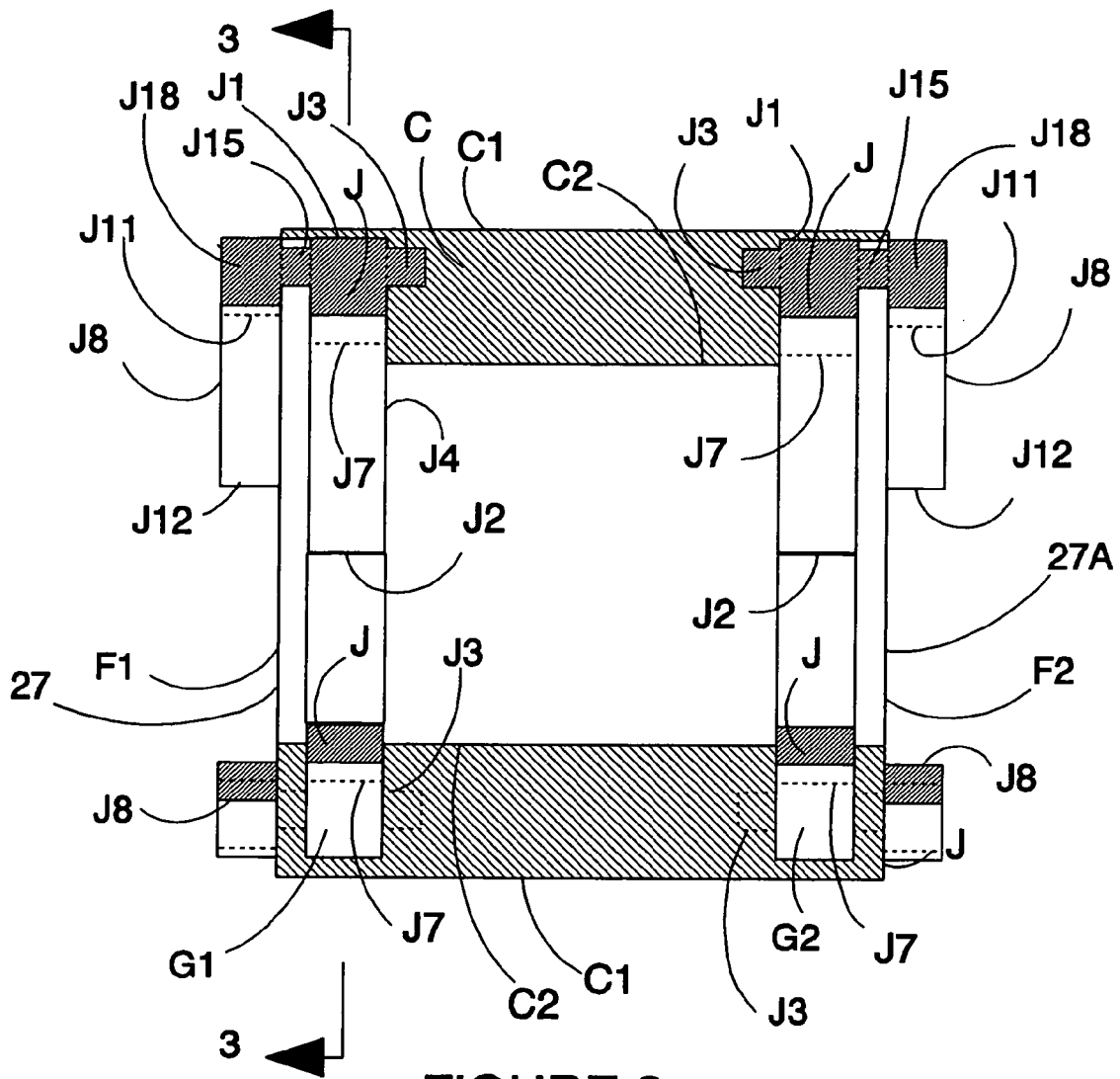
Figure 4:
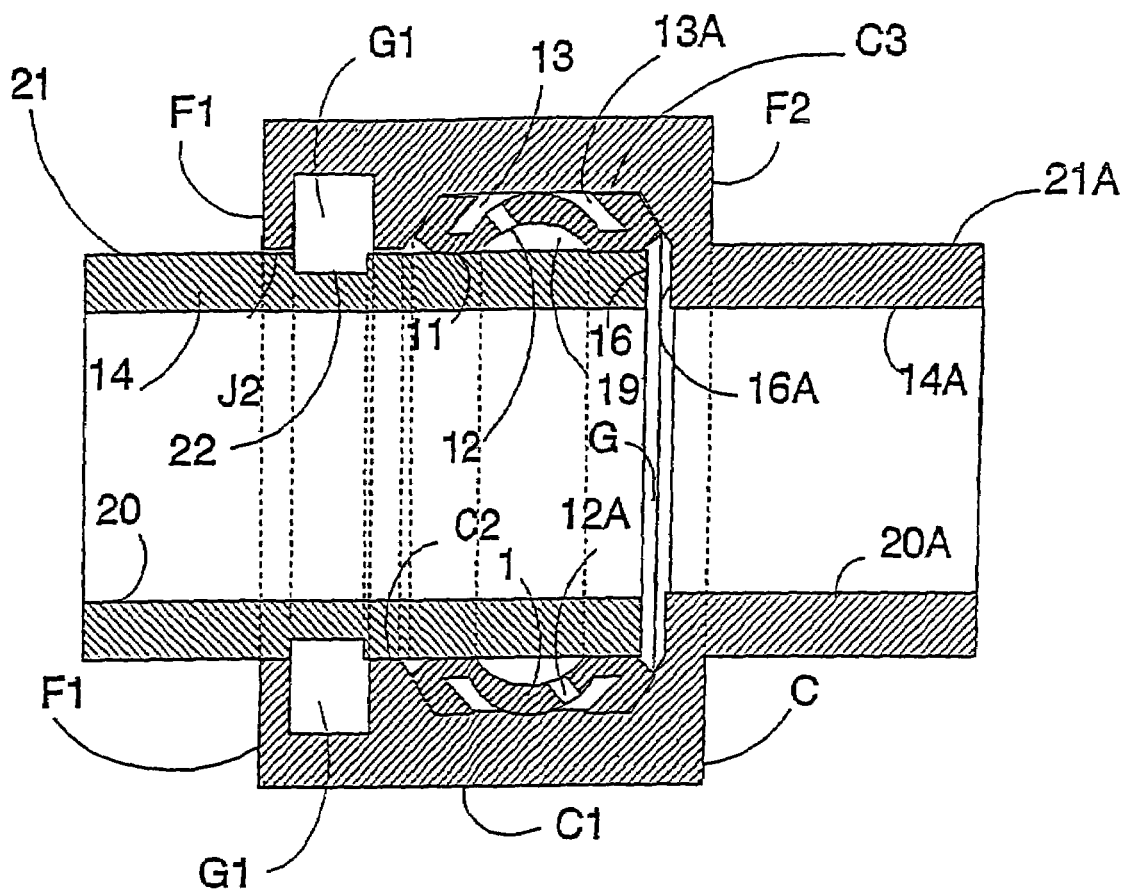
Figure 5:
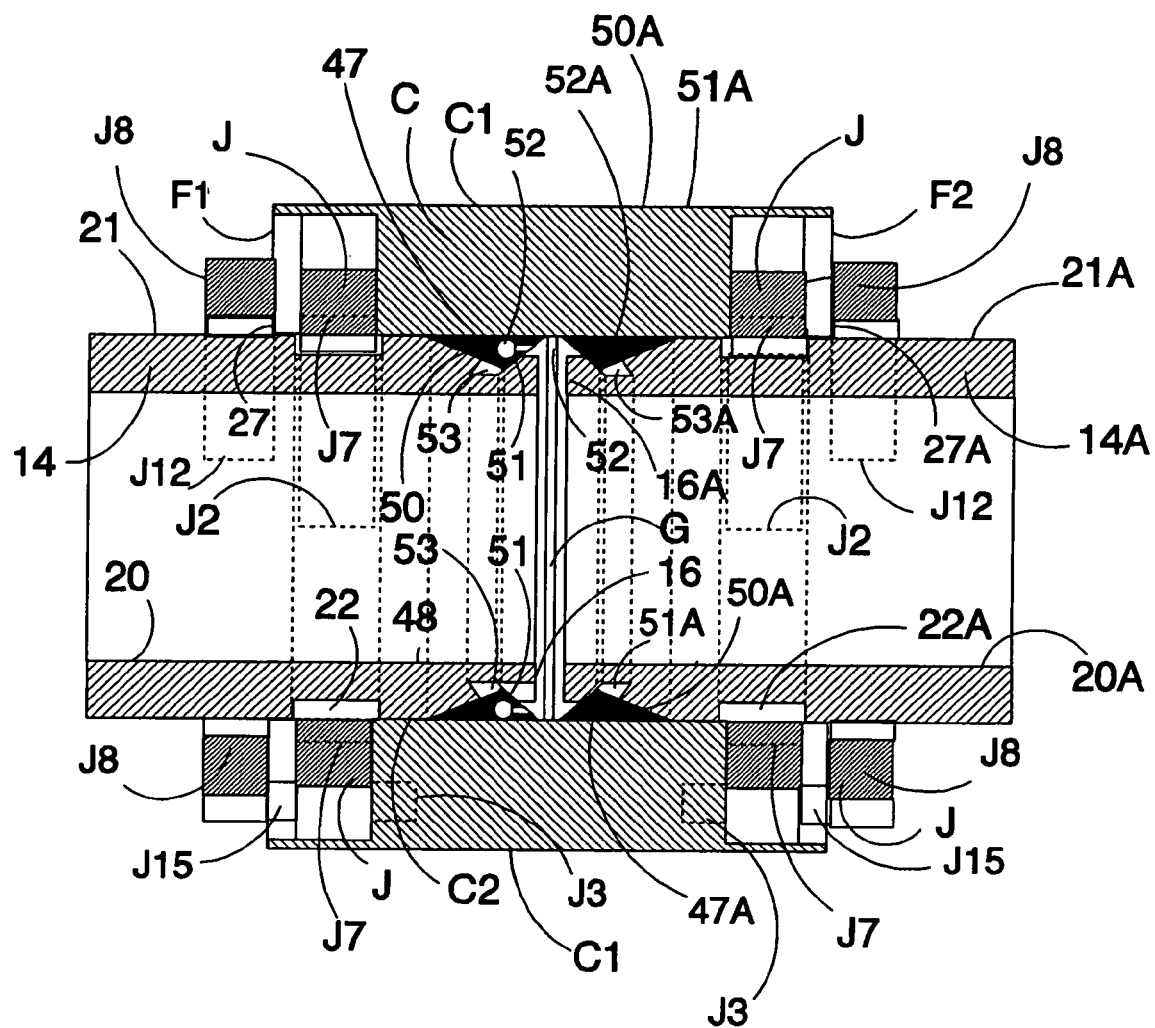
Figure 6:
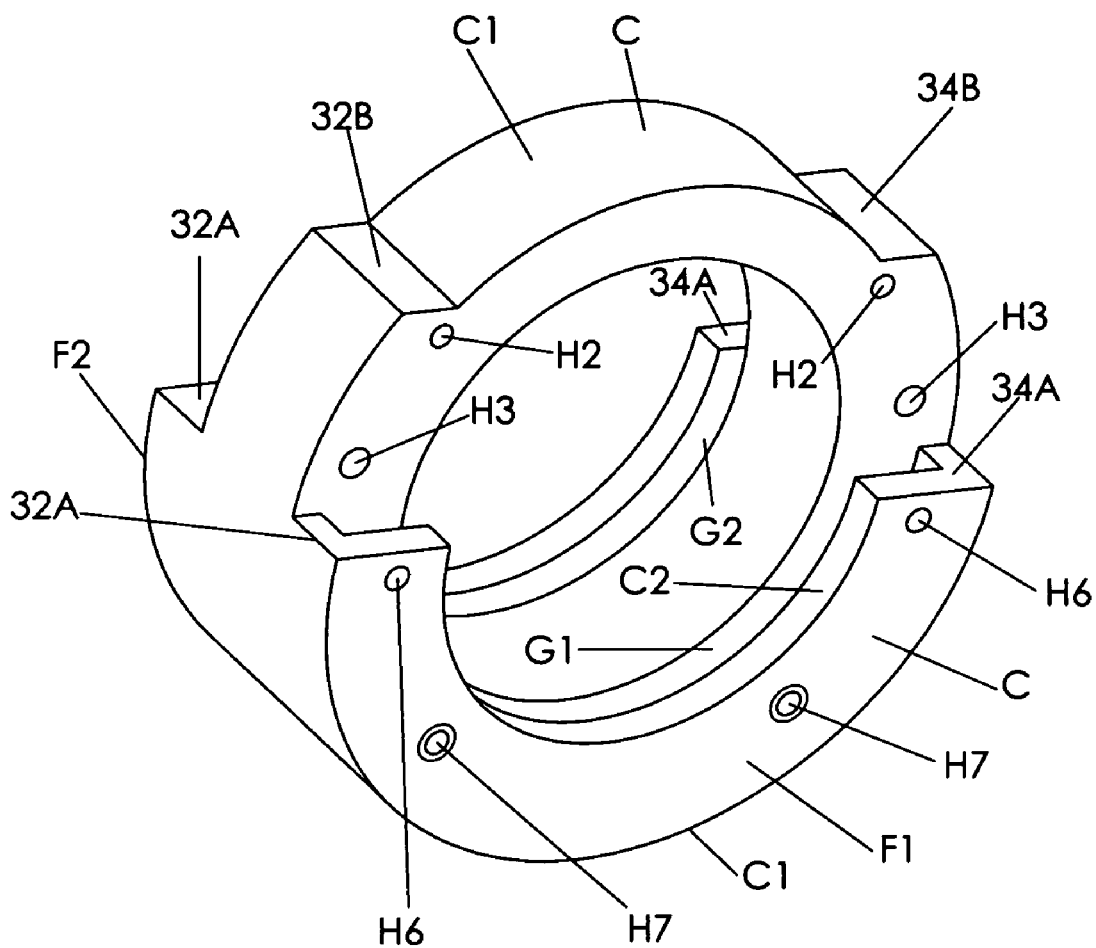
Figure 7A:
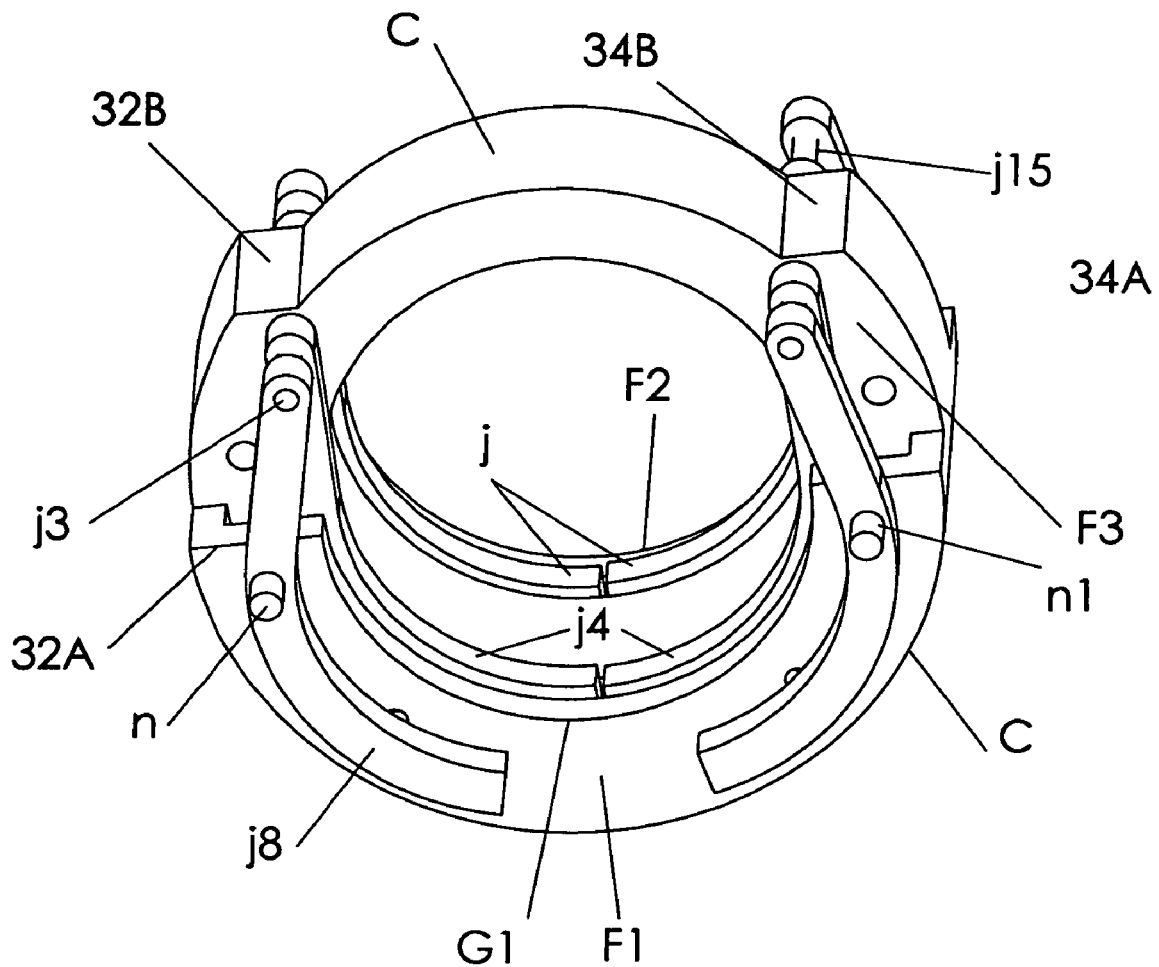
Figure 7B:
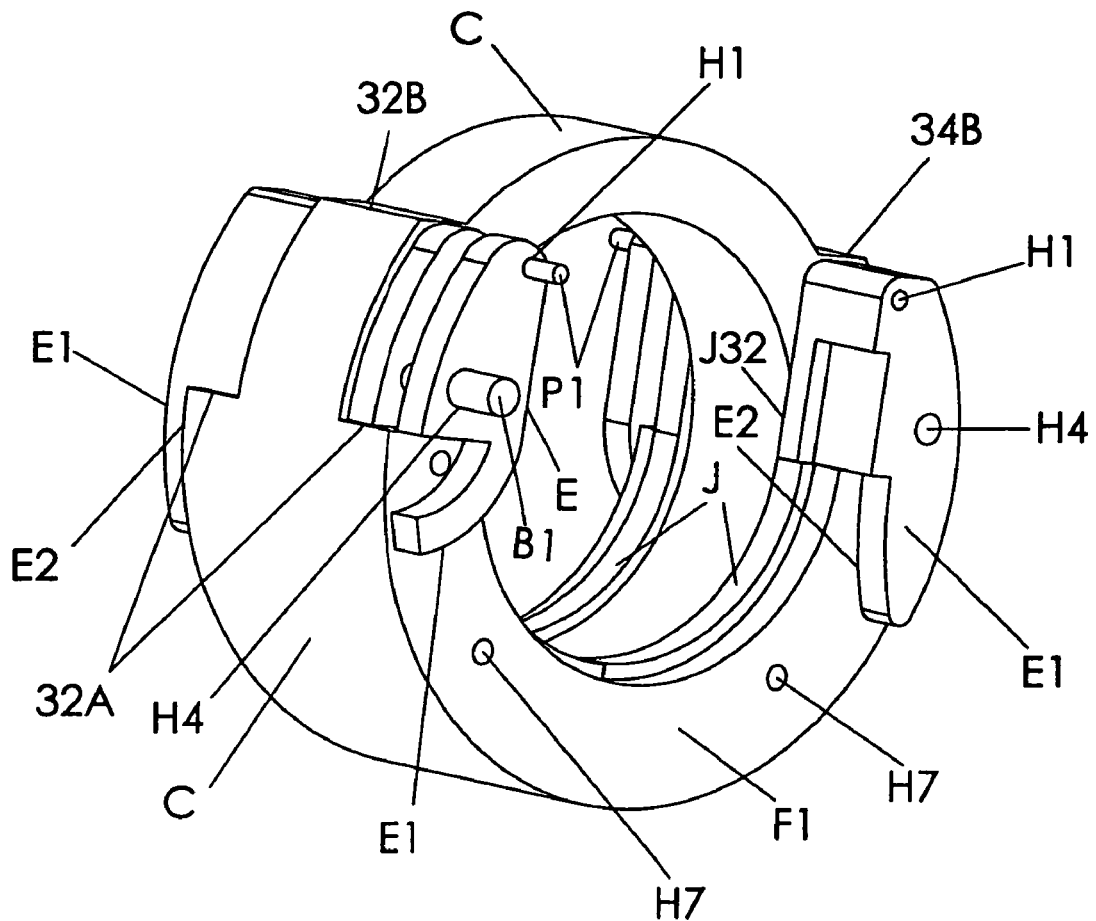
Figure 8:
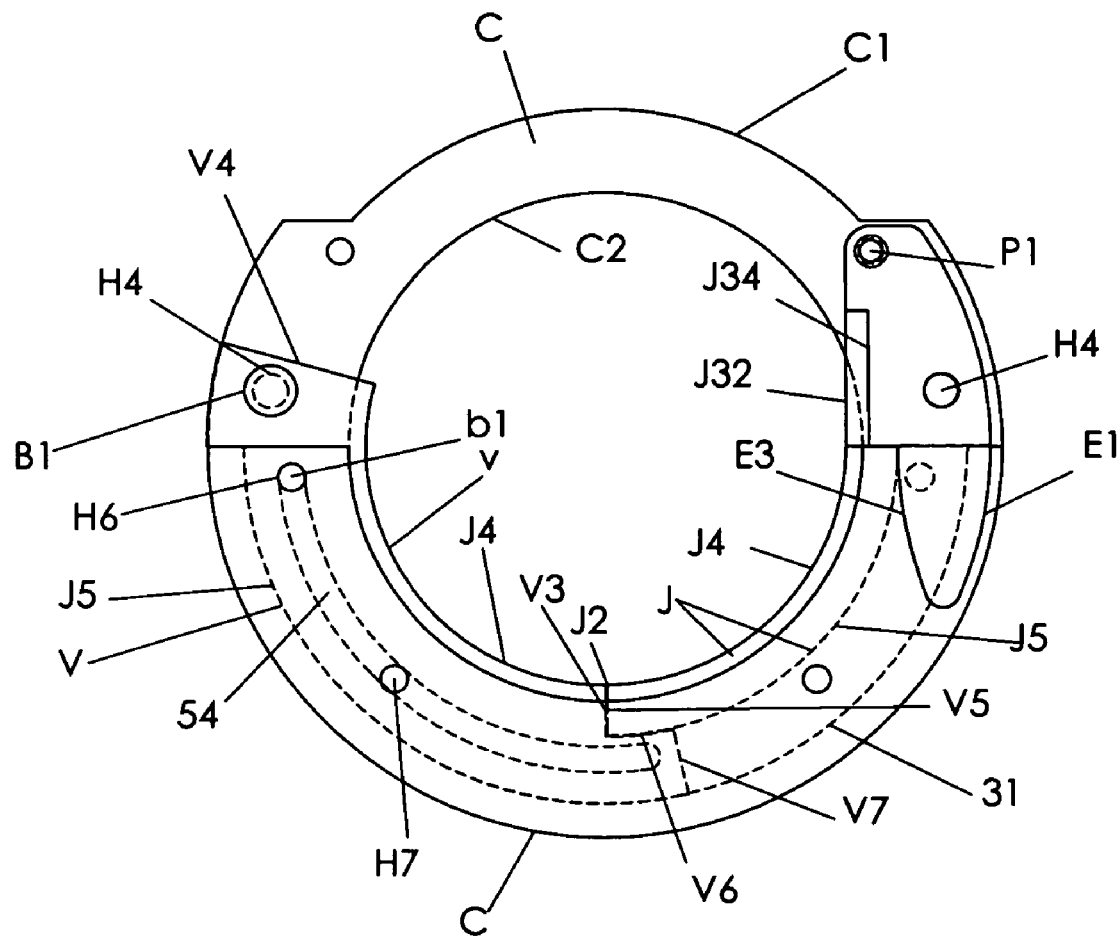
Figure 9:
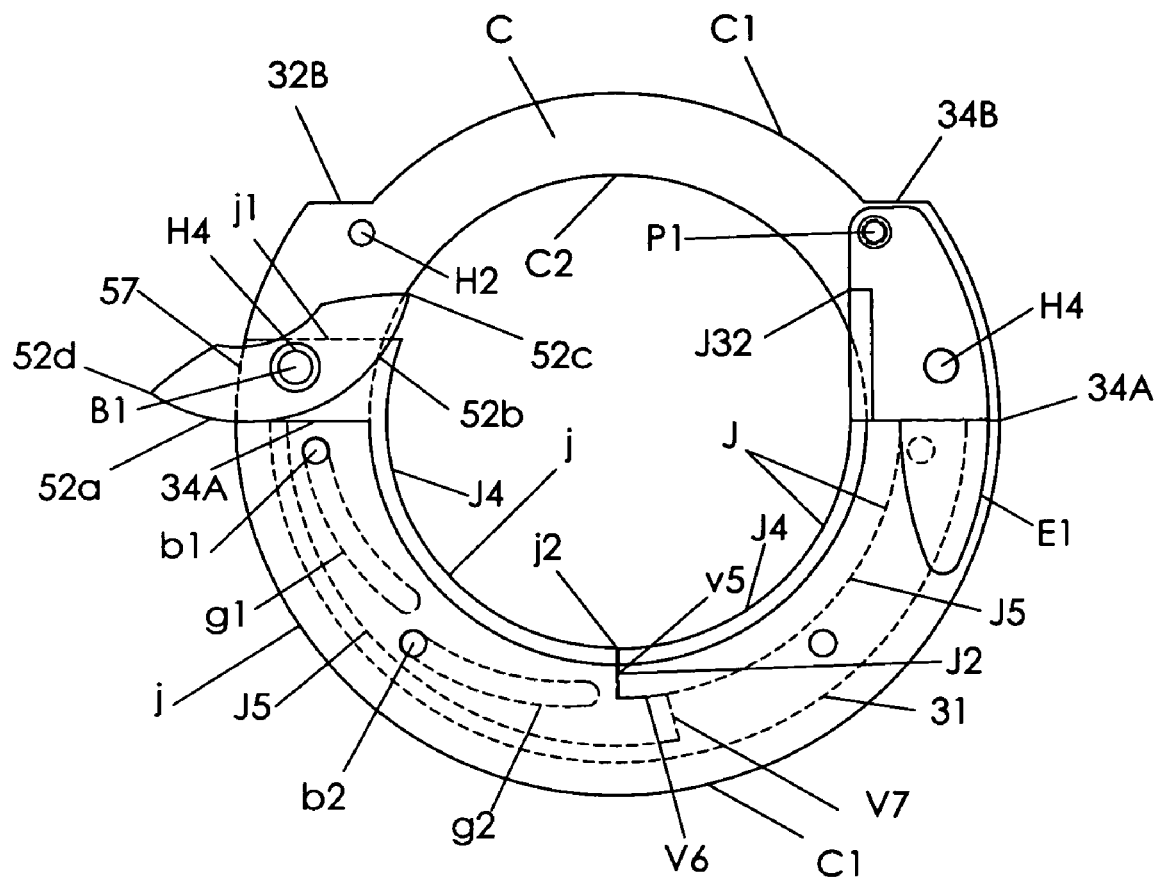
Figure 11:
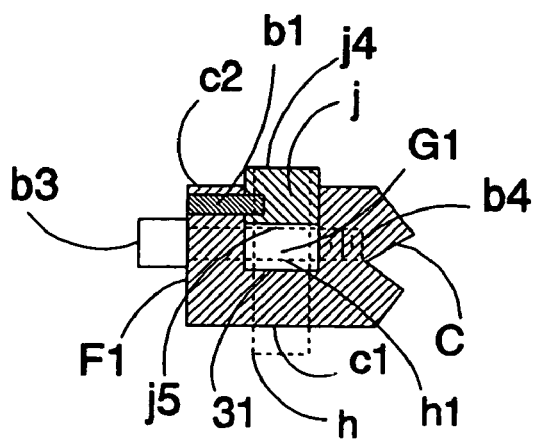
Figure 10:
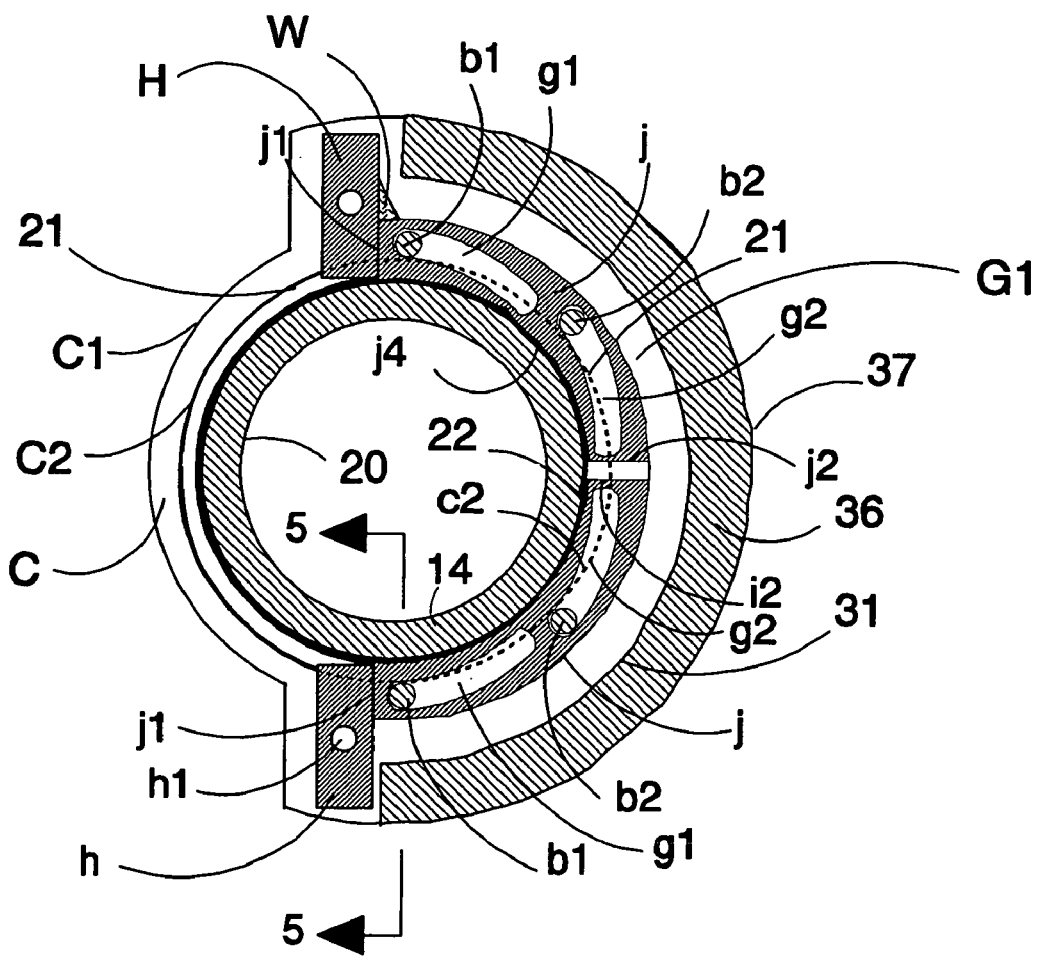
Figure 12:
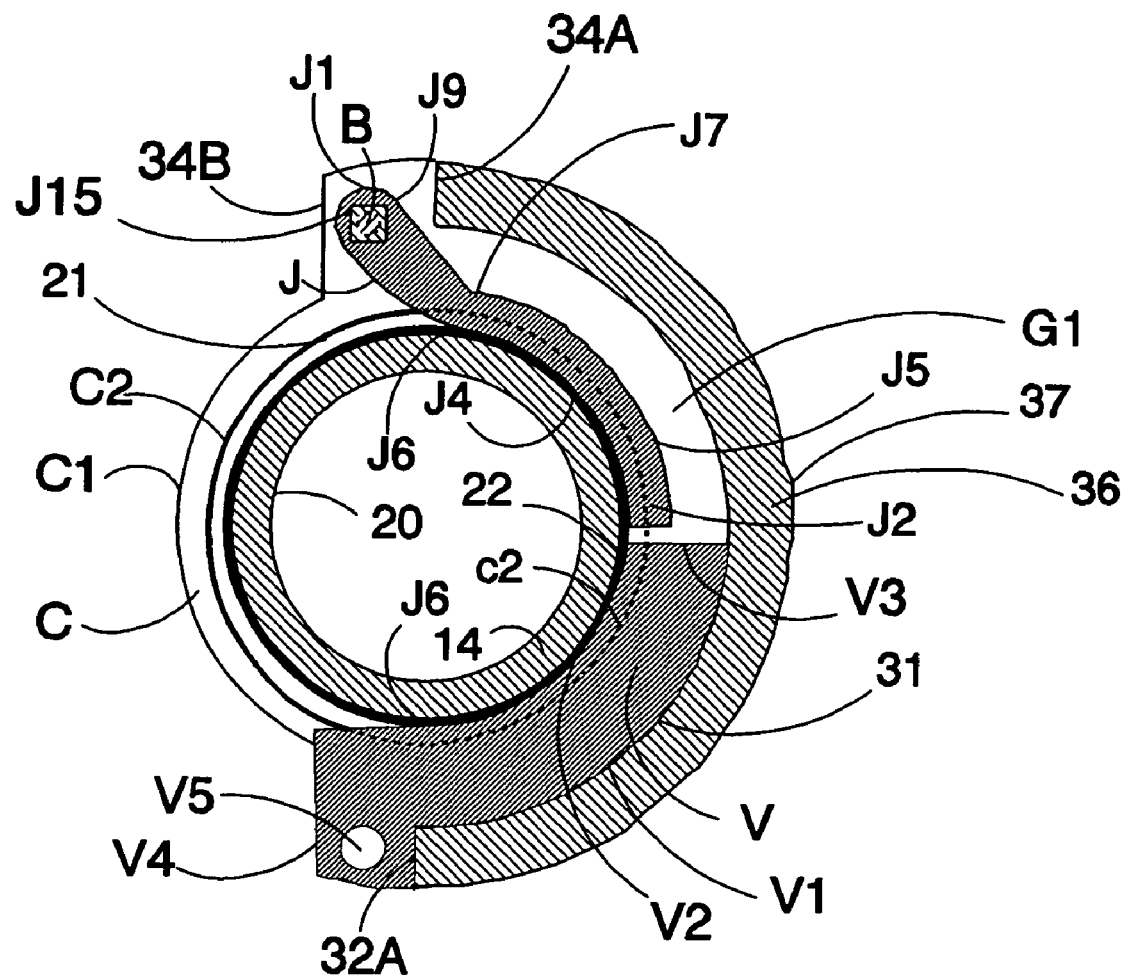
Figure 13:
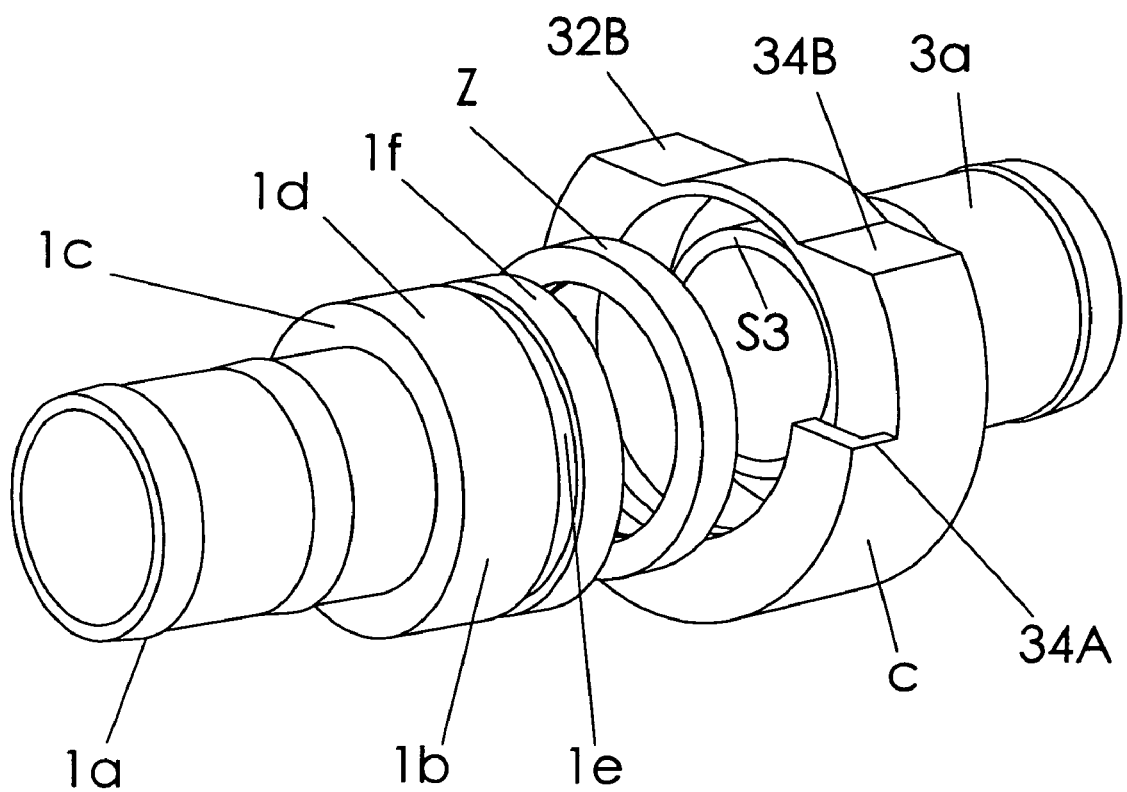
Figure 14:
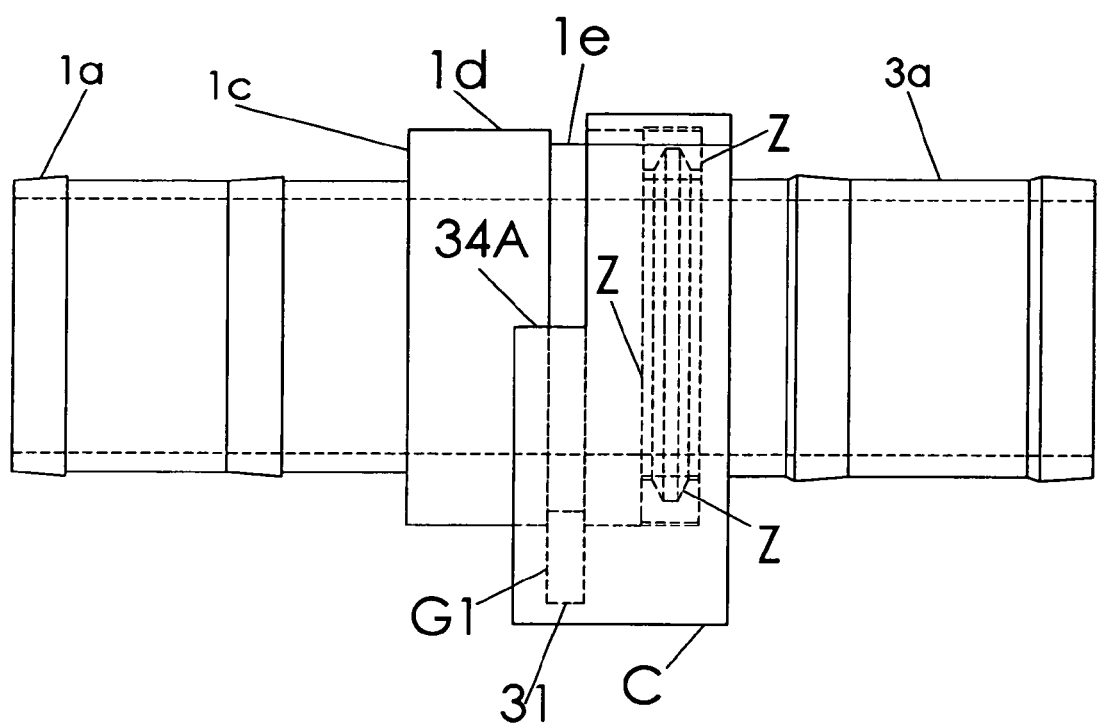
Figure 15:
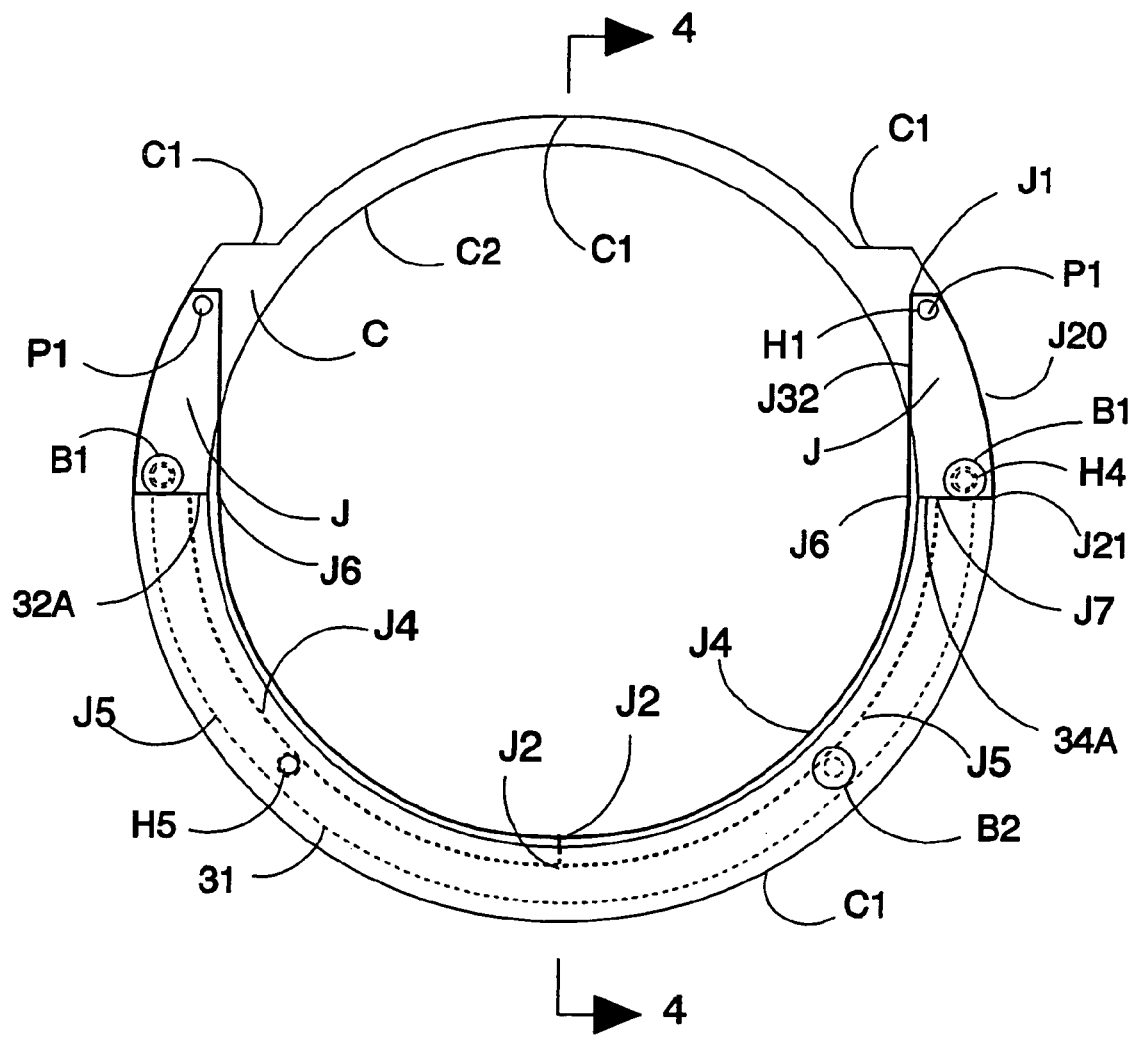
Figure 16:
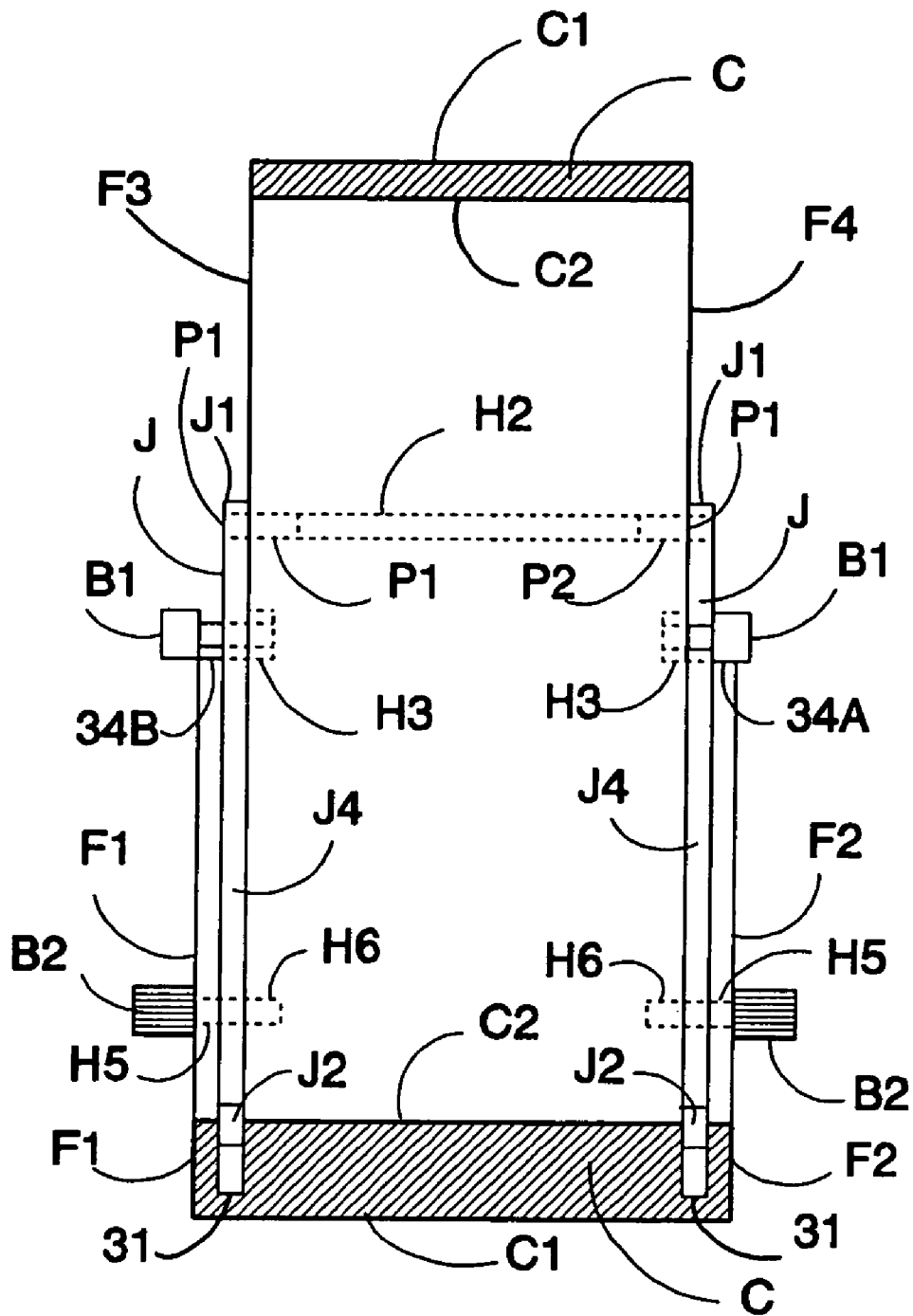
Figure 17:
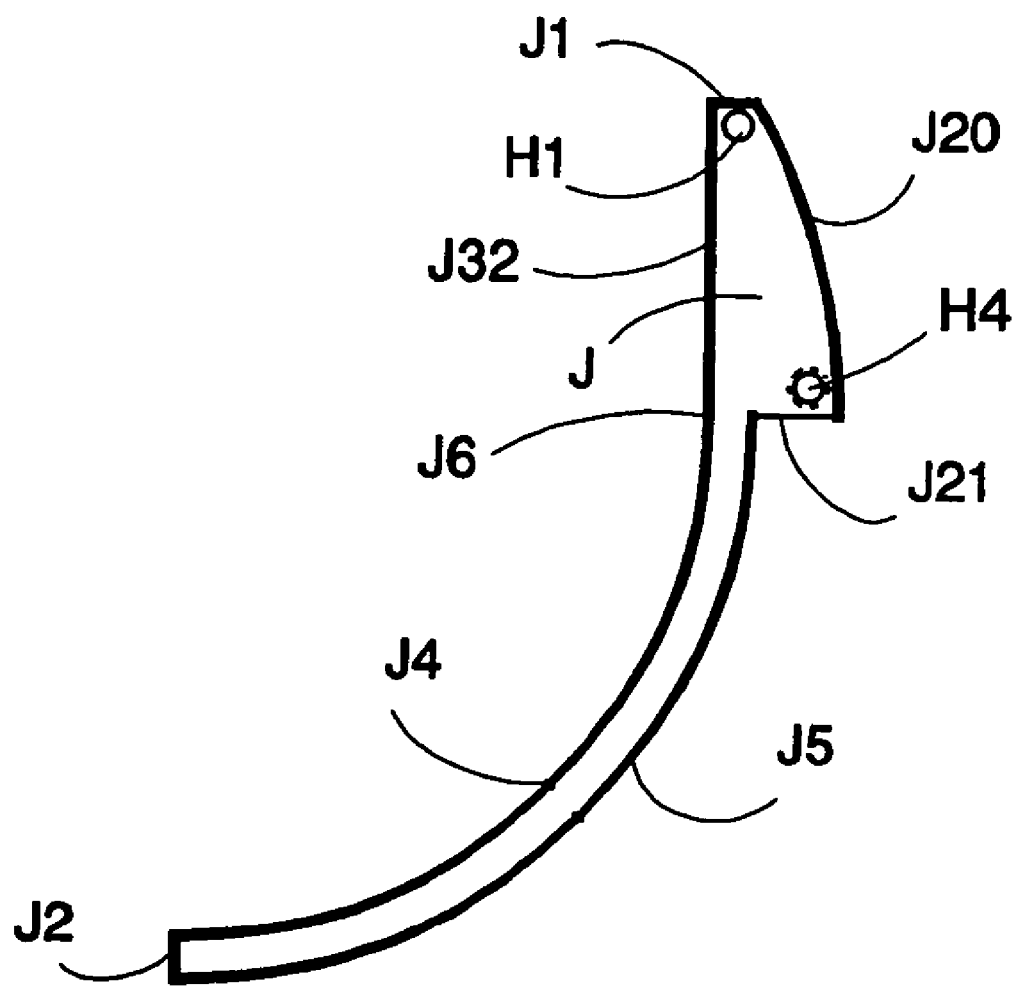
Figure 18:
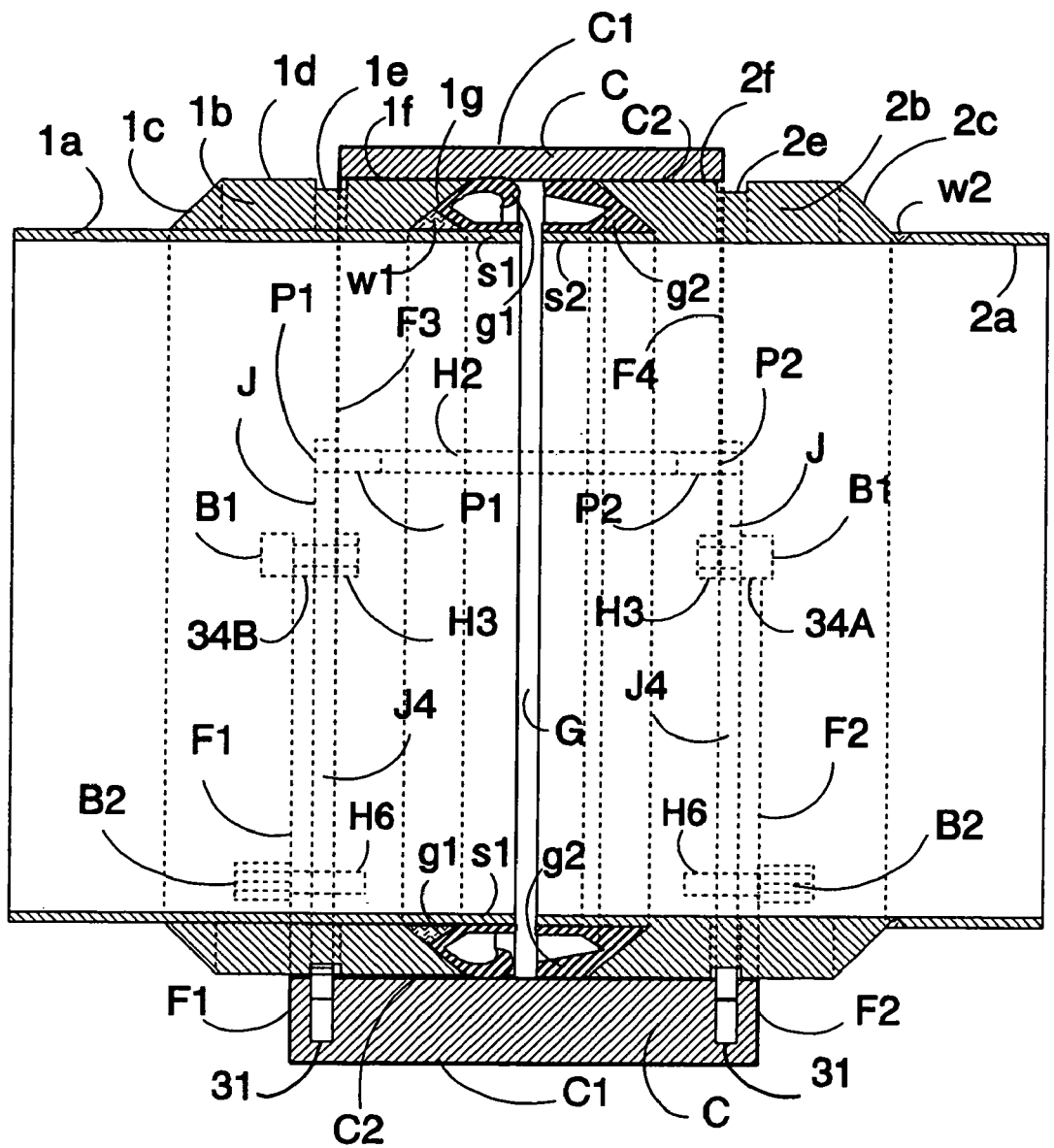
Figure 19:
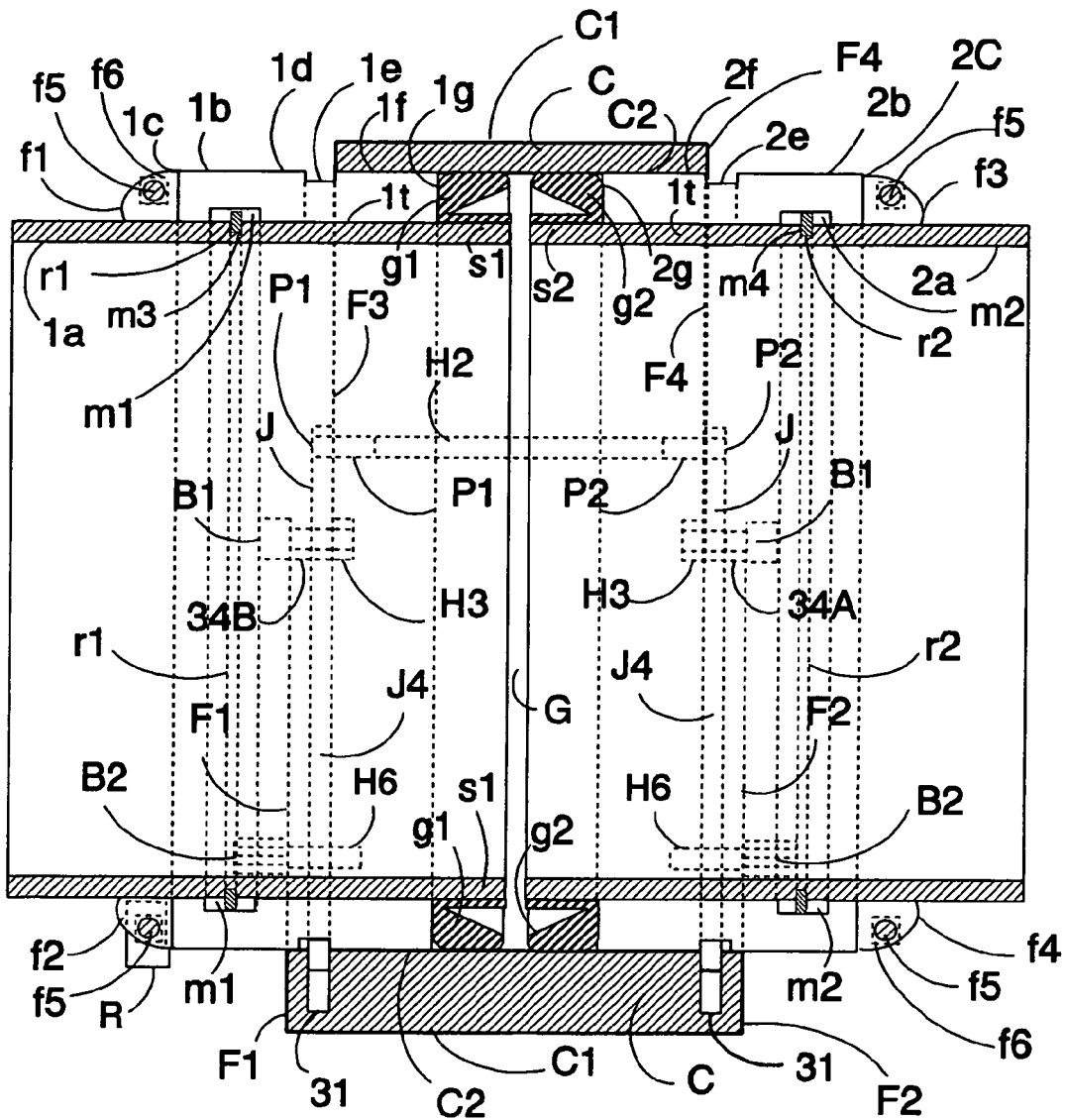
Figure 20:
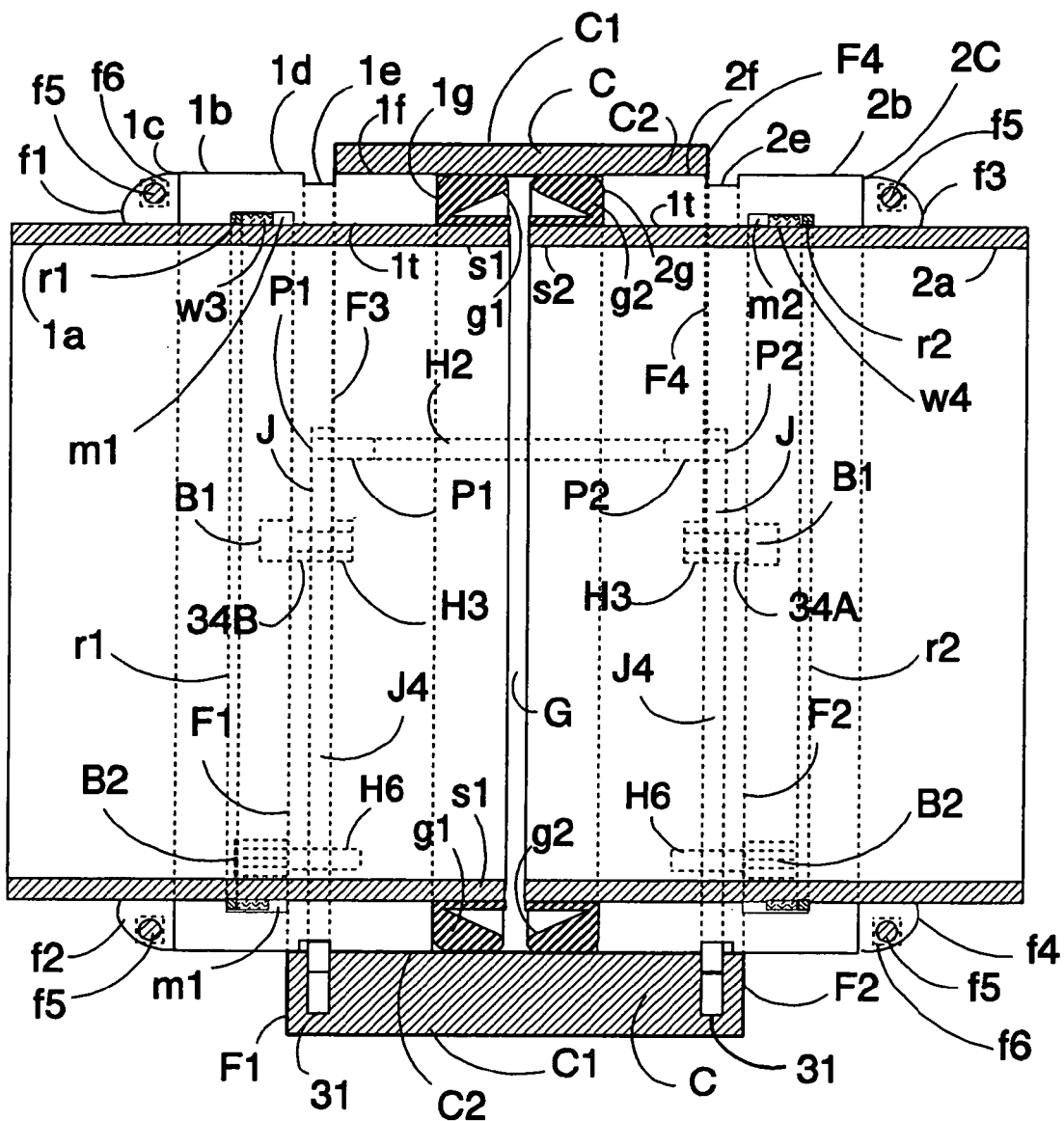
Figure 21:
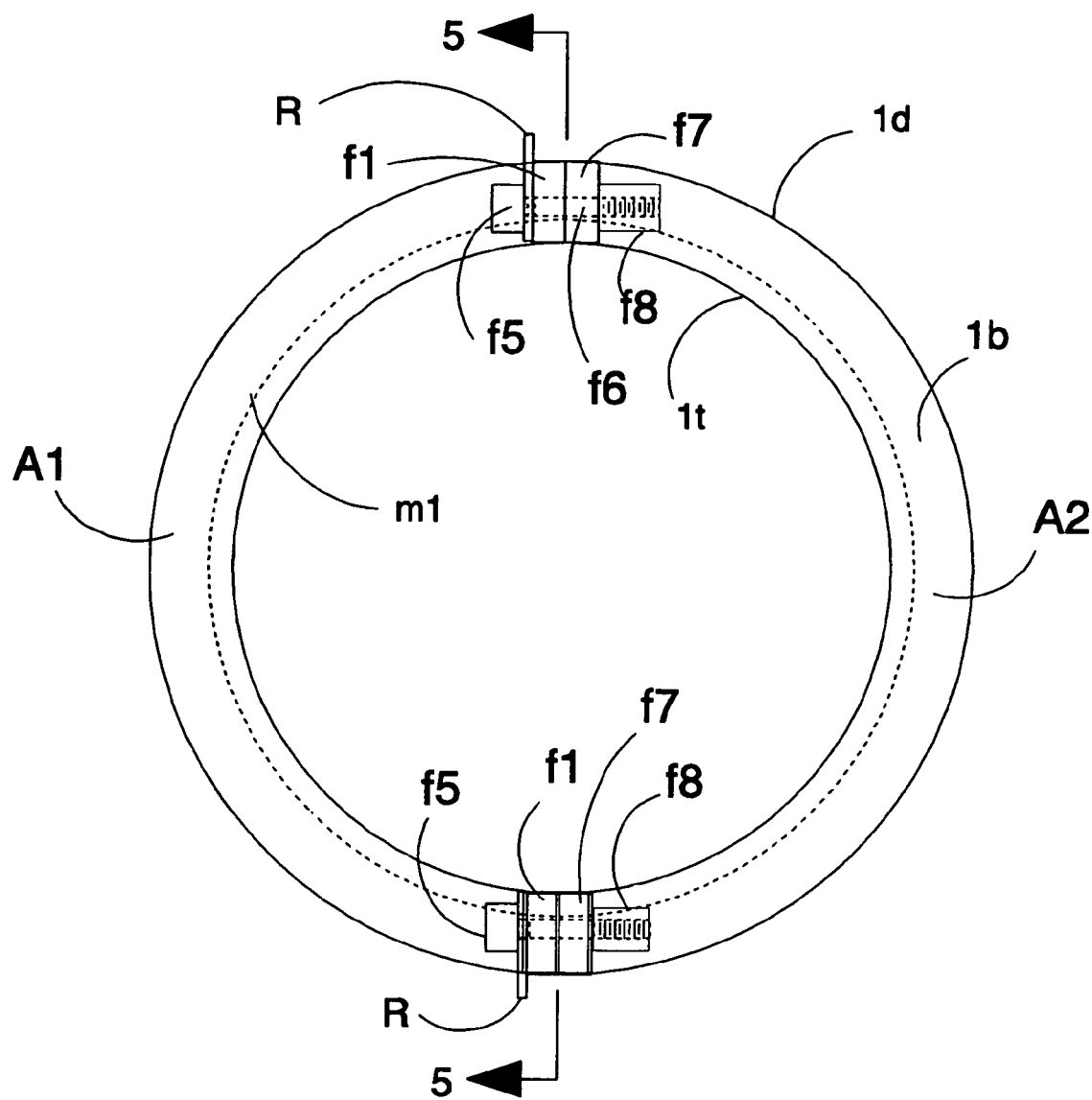
Figure 22:
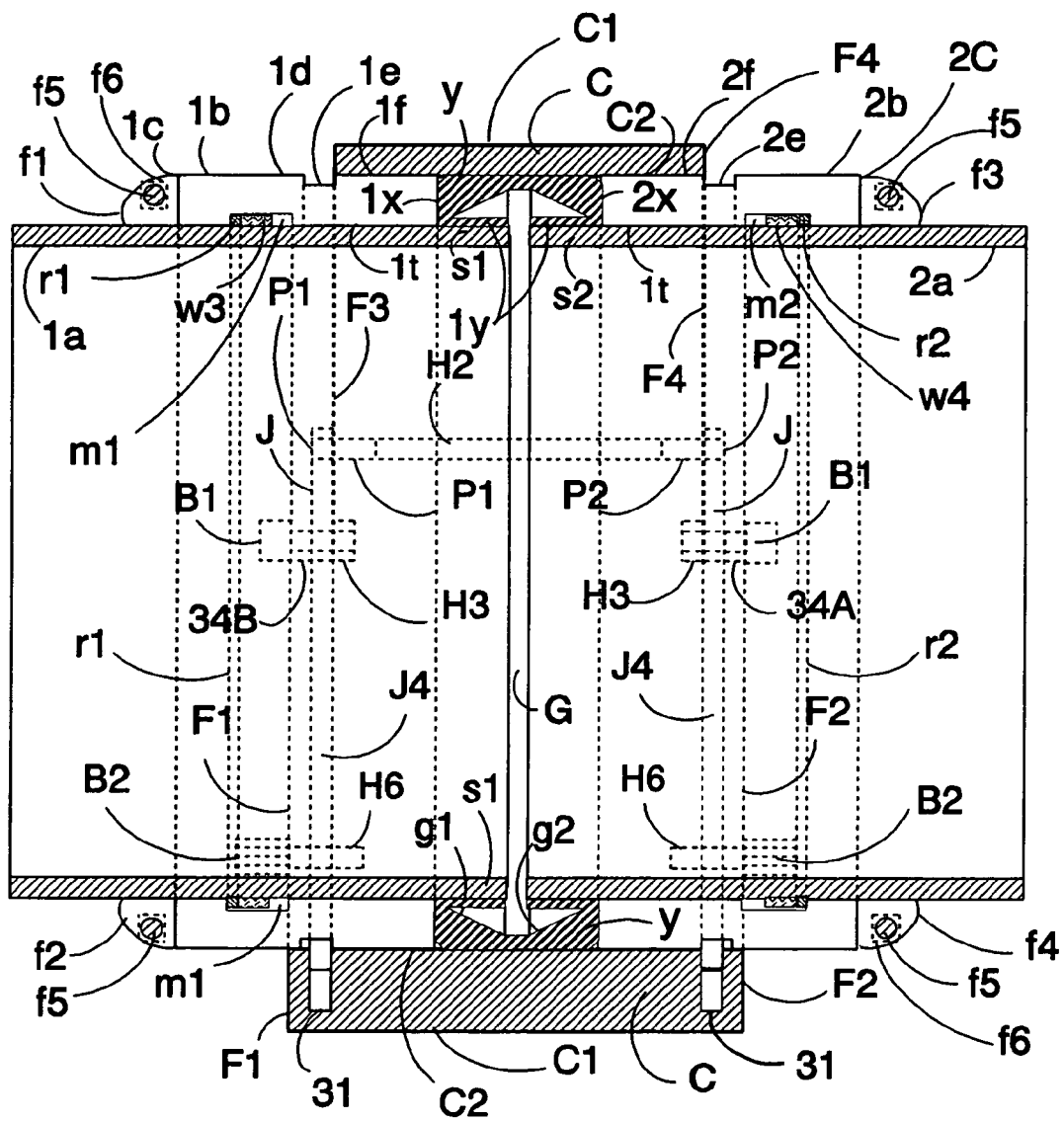
Figure 23:
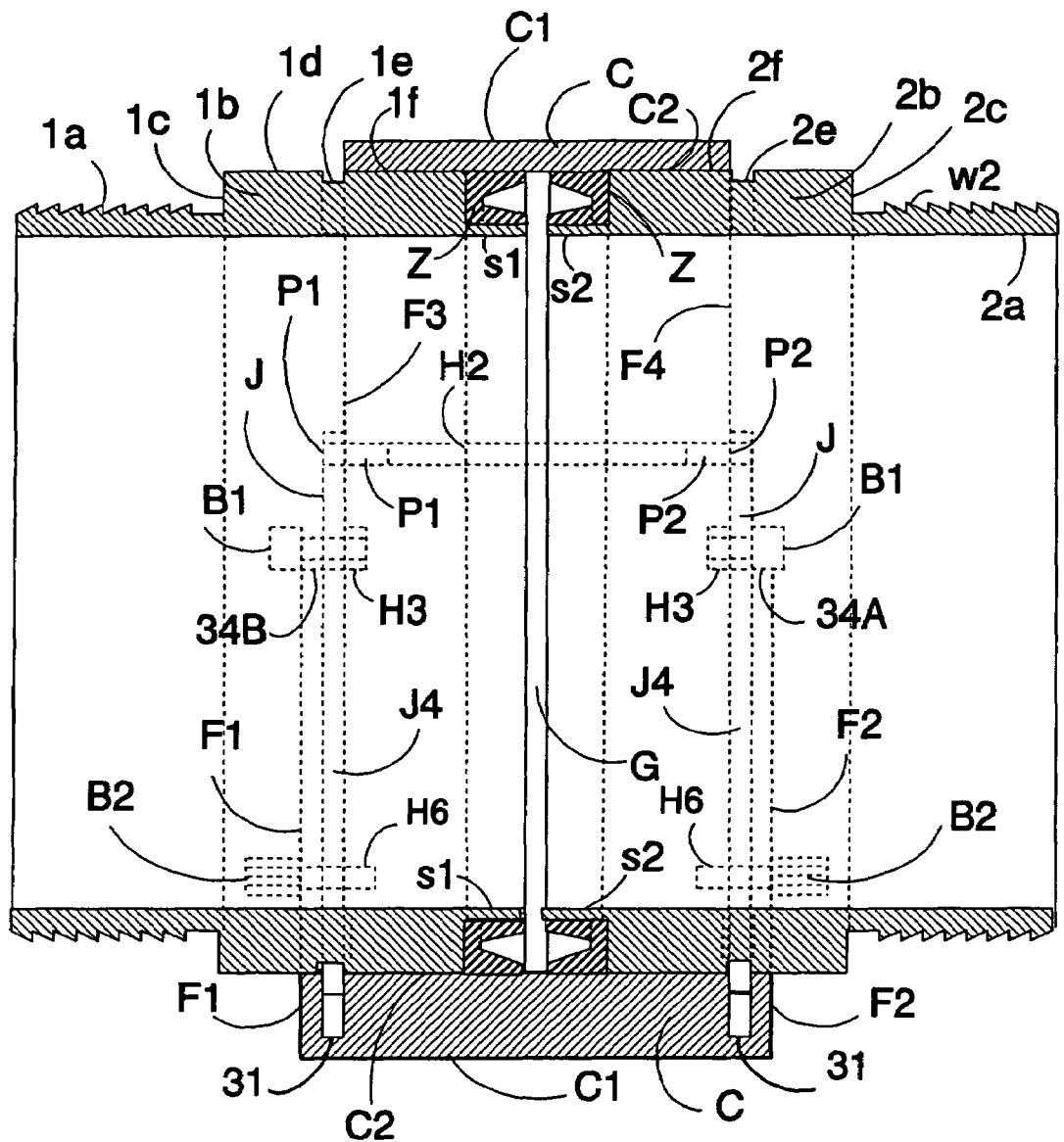
Figure 24:
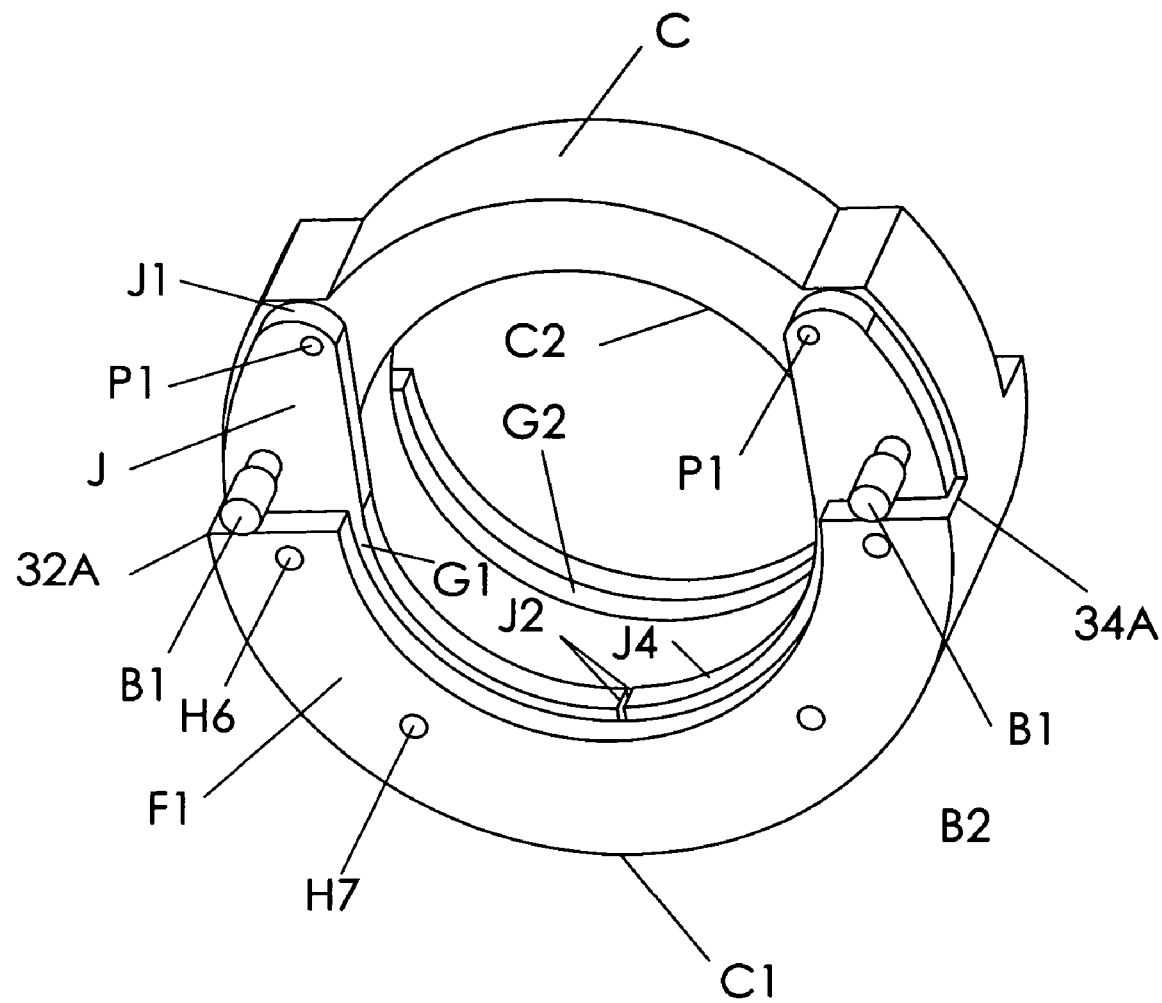
Figure 25:
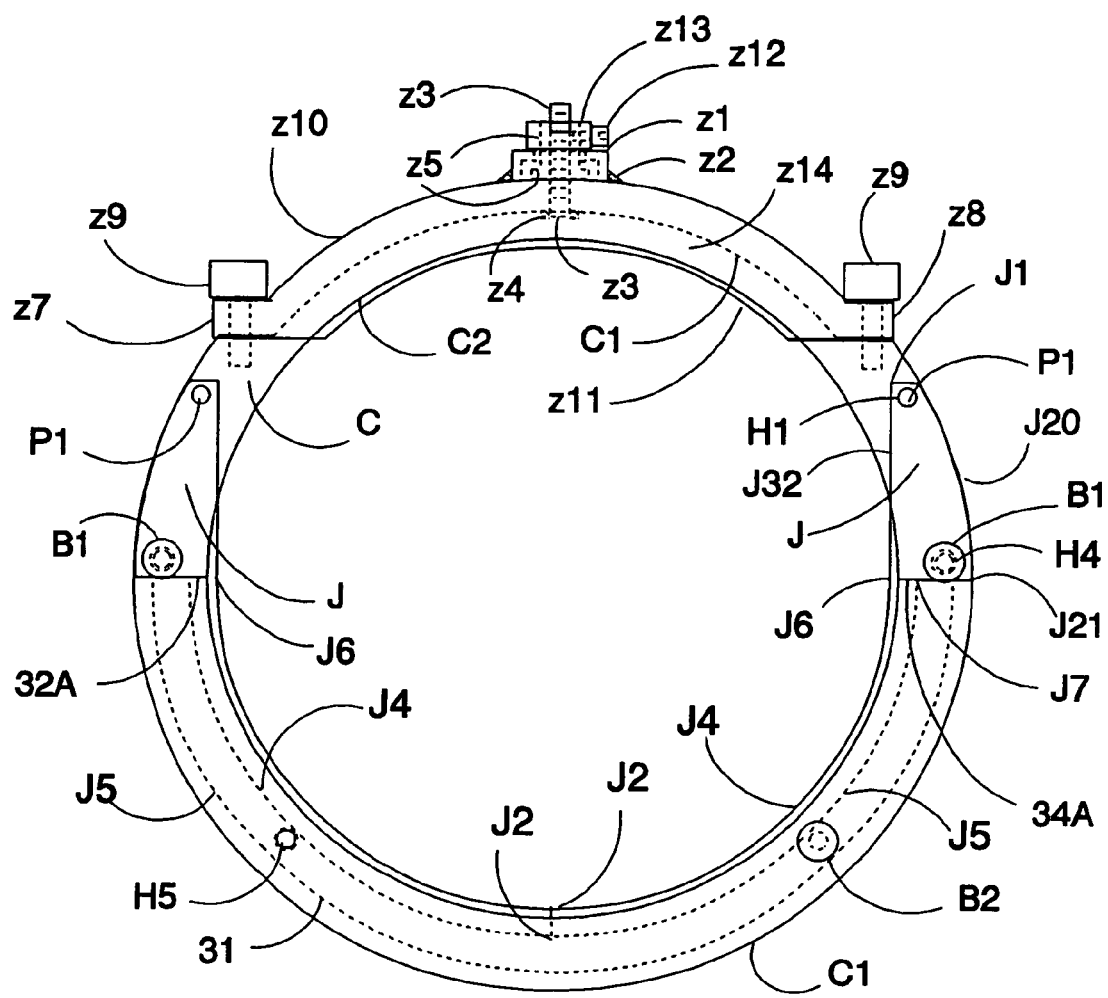
Figure 26:
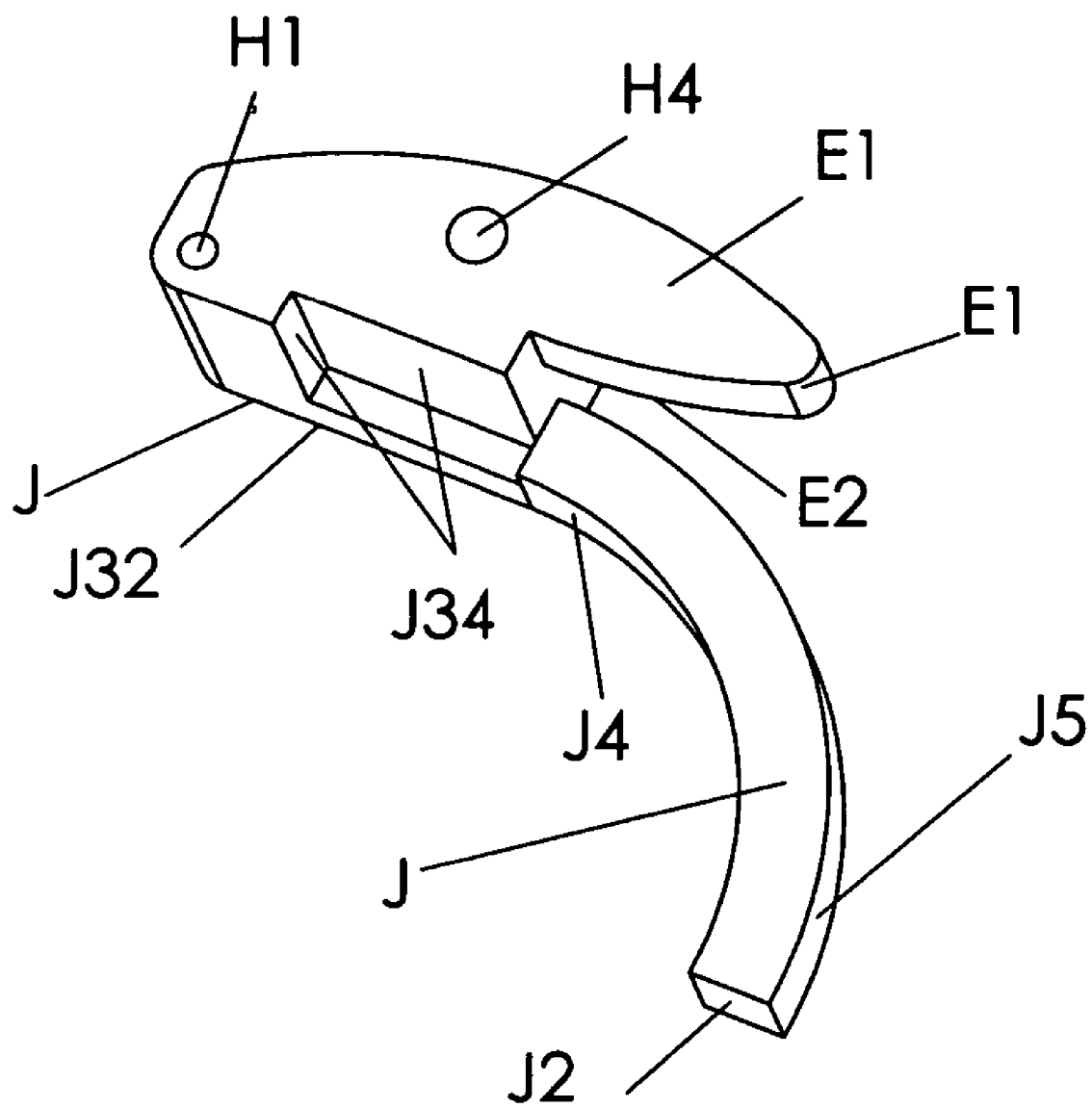
Figure 27:
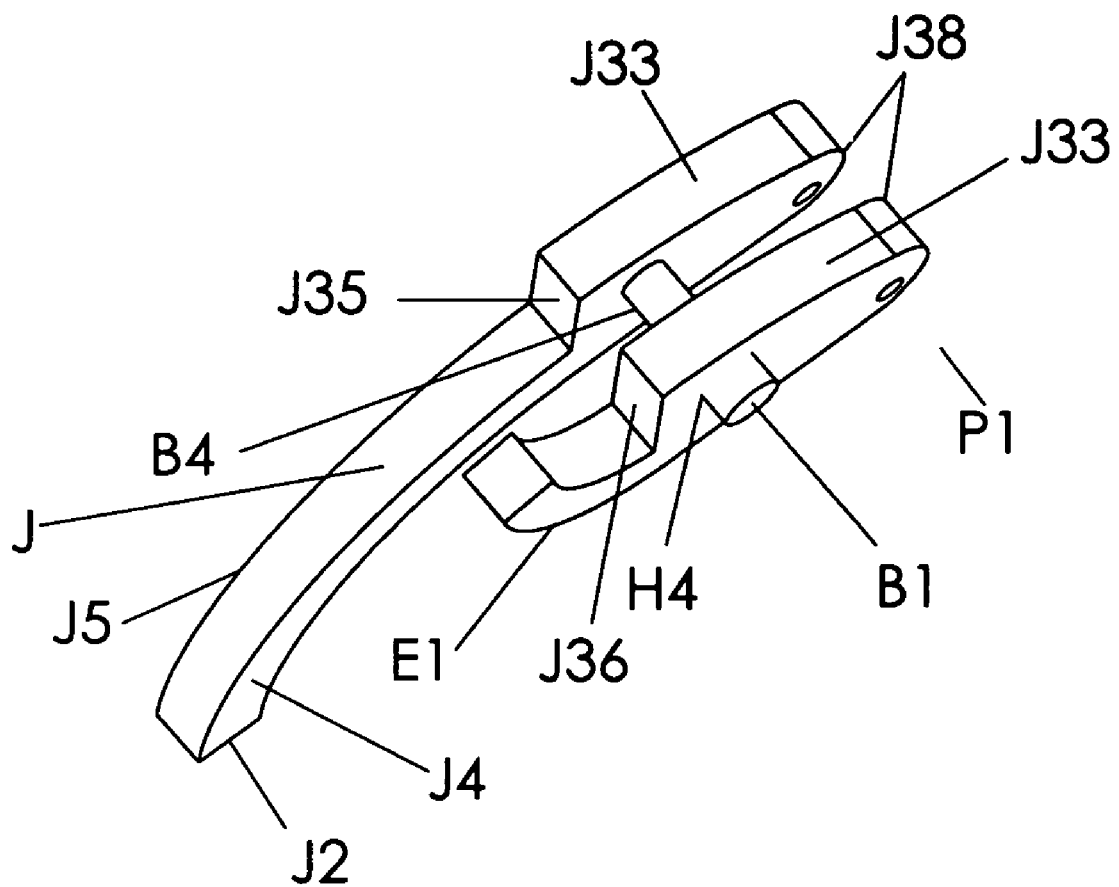
Figure 28:
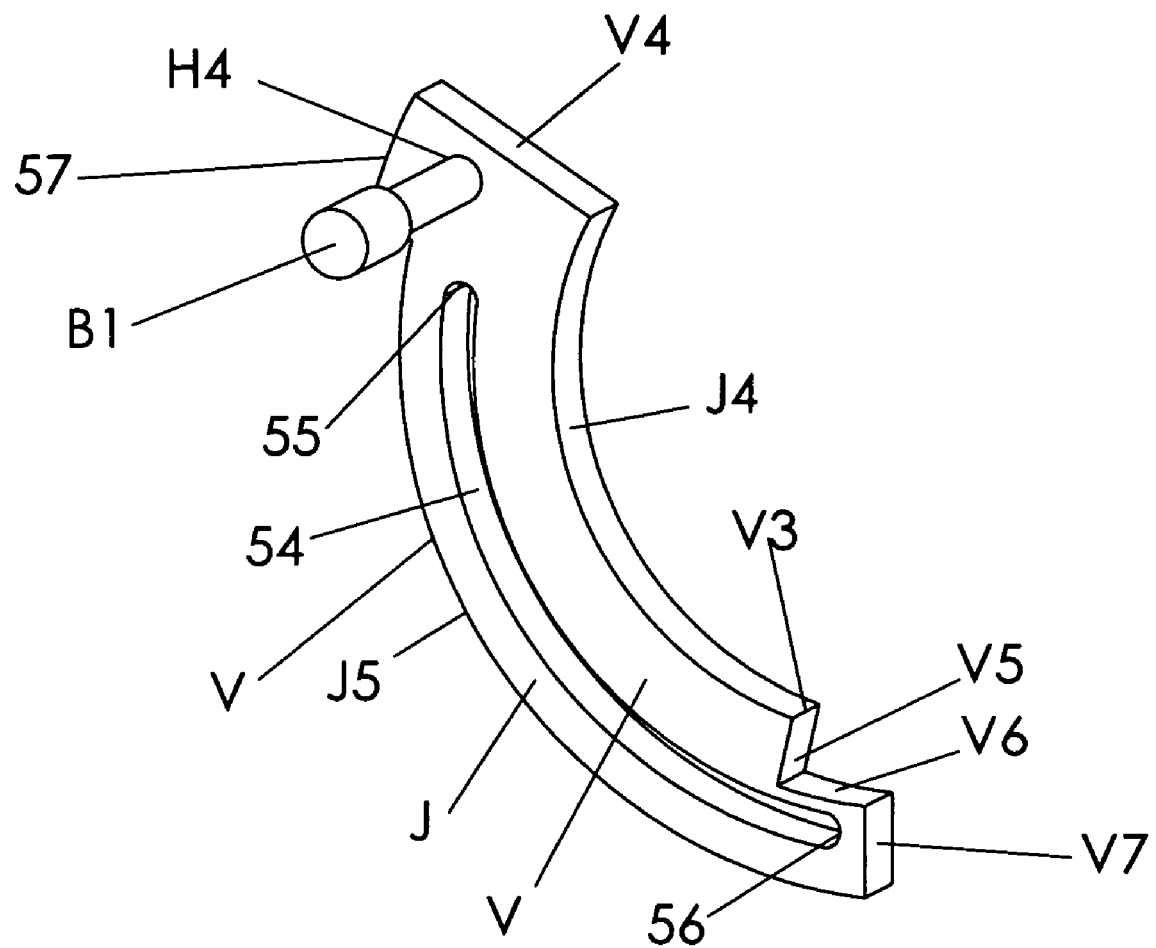
Figure 29:
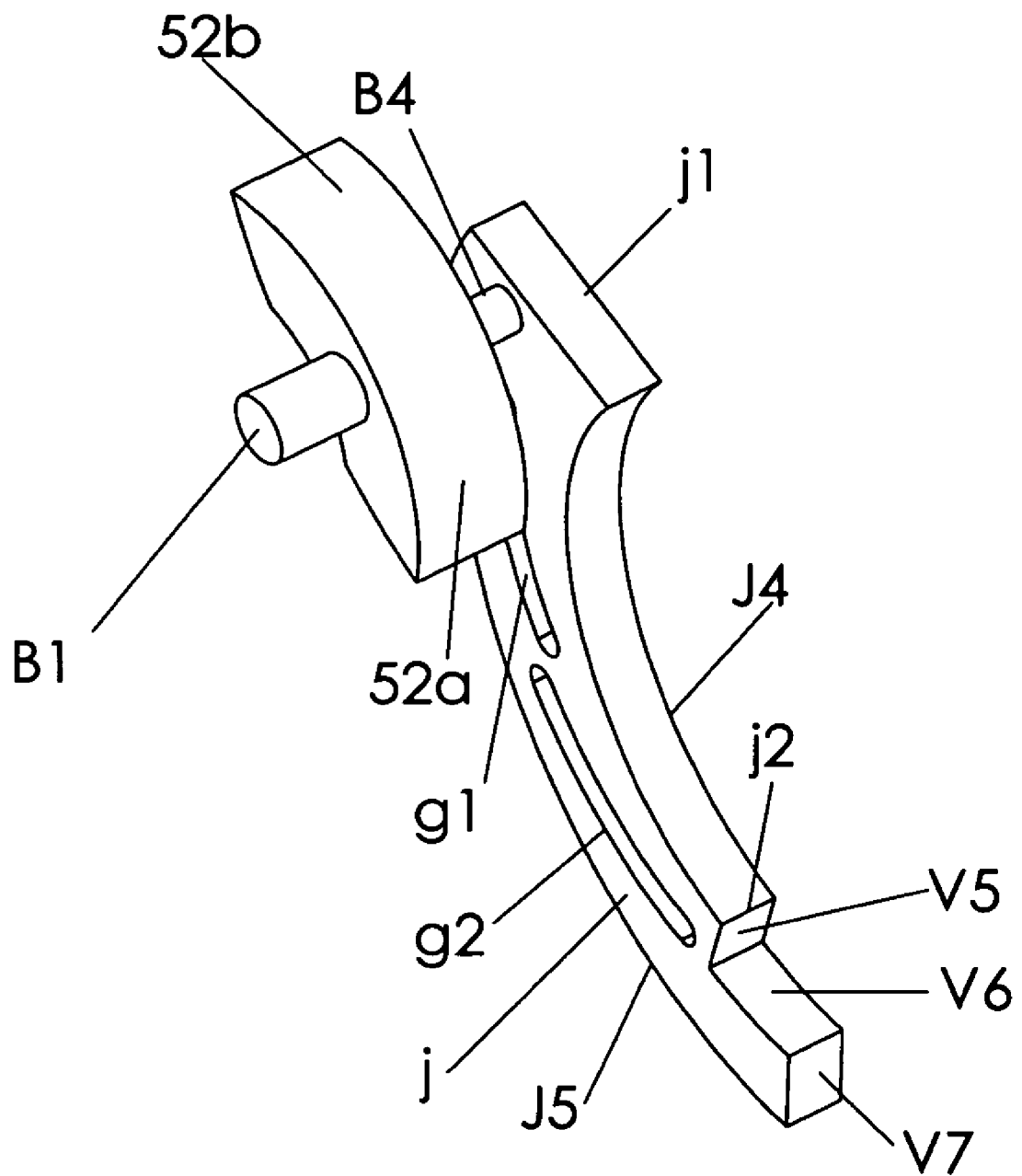
Figure 30:
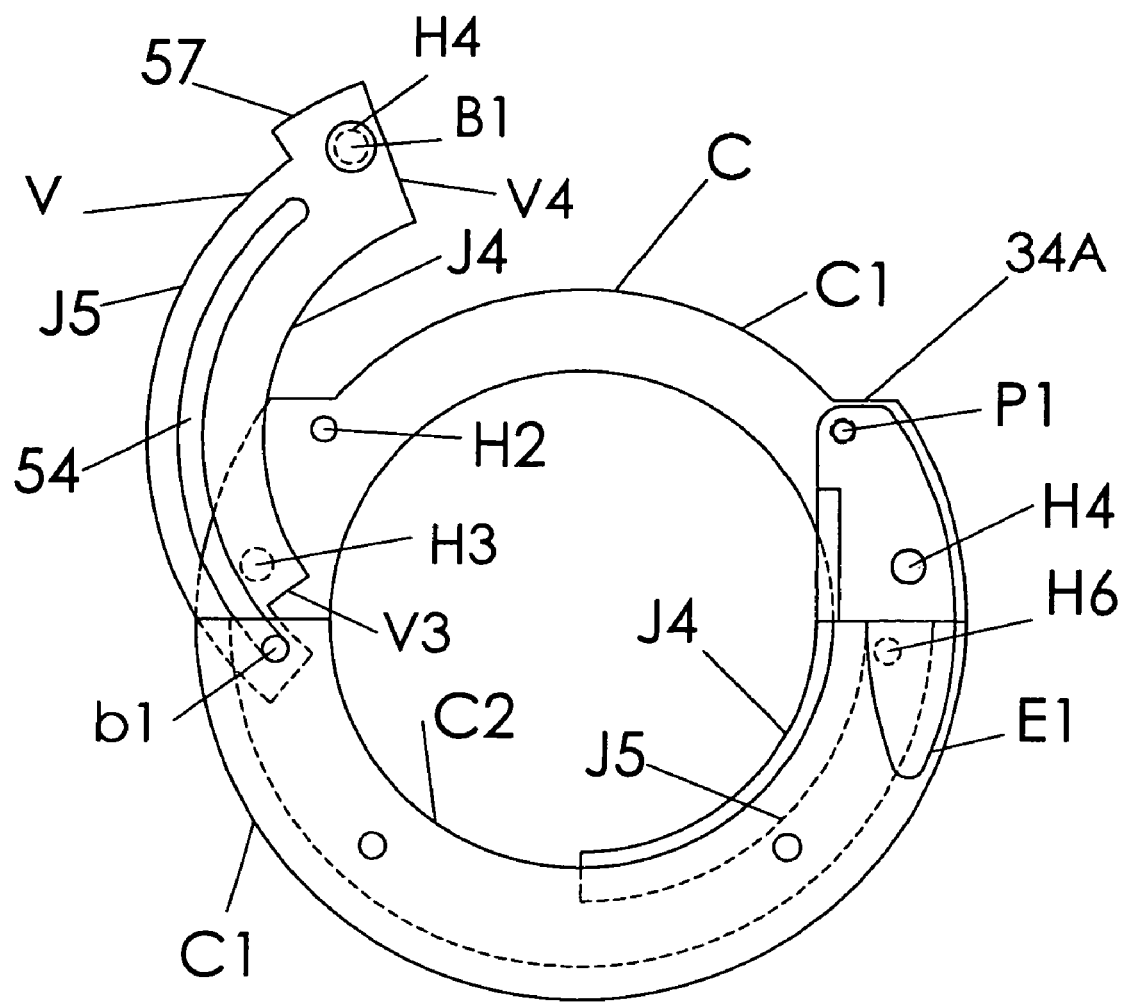

The best mode presently contemplated for carrying out the invention is illustrated in the accompanying drawings, in which:

FIG. 1 is a transverse vertical section of the coupling of the invention taken through the lever jaws in engaged and locked position in the groove of a pipe to be coupled;

FIG. 2, a section similar to that of FIG. 1, taken on line 3-3 of FIG. 3, where relative positions of weight and power arms with respect to one another are shown;

FIG. 3, a longitudinal vertical section taken on line 2-2 of FIG. 2, where pipes are not shown, but only the coupling is depicted;

FIG. 4, a longitudinal vertical section of a one ended bell type coupling of FIG. 1, lever jaws not being shown, and showing the coupling connected to the end portion of a pipe and showing a diaphragm seal;

FIG. 5, a longitudinal vertical section of a two ended coupling of FIG. 1 taken on the line 1-1 of FIG. 1 showing two triangular type seals;

FIG. 6, a perspective view of a standardized coupling body of a different embodiment of the invention;

FIG. 7A, a perspective view of a coupling using the coupling body of FIG. 6, showing lever jaws of the invention installed on the coupling body;

FIG. 7B, a perspective view of a coupling using the coupling body of FIG. 6, showing a different embodiment of lever jaws installed thereon, the lever jaws being shown in FIGS. 26 and 27;

FIG. 8, an end elevation of a coupling using the coupling body of FIG. 6 and showing a combination of a lever jaw and a non-camming flat jaw used therewith, the jaws being shown in FIGS. 26 and 28;

FIG. 9, an end elevation of a coupling similar to that of FIG. 8 using the coupling body of FIG. 6 and showing a combination of a lever jaw and a camming flat jaw used therewith, the jaws being shown in FIGS. 26 and 29;

FIG. 10, a transverse section of a coupling showing a pair of camming jaws mounted in the coupling;

FIG. 11, a fragmentary section taken on the line 5-5 of FIG. 10;

FIG. 12, an end elevation of the coupling of FIG. 8, showing the non-camming flat jaw in pipe releasing position;

FIG. 13, an exploded view of a hose coupling of the invention;

FIG. 14, a side elevation of the hose coupling of FIG. 13 showing the hose shanks in coupled condition;

FIG. 15, an end elevation of a coupling of the invention with lever jaws having the power arm and the weight arm integrated in the same plane as a monolithic unit;

FIG. 16, a longitudinal vertical section taken on line 4-4 of FIG. 15;

FIG. 17, a top plan view of a lever jaw as used in FIGS. 15 and 16;

FIG. 18, a longitudinal vertical section of the two ended coupling of FIG. 16 showing pipes coupled therein, and showing forward open ended "U" type seals mounted in front of slanted faces of two rings provided at the opposite ends of the coupled pipes;

FIG. 19, a longitudinal vertical section taken on line 5-5 of FIG. 21, showing two opposite "U" type seals mounted in front of vertical faces of opposite split rings mounted around rings embedded into the circumferential groove of PVC, or polyethylene pipe, or any other pipe in the similar class, having a high thermal coefficient of expansion;

FIG. 20, a longitudinal vertical section similar to that of FIG. 18, except that split rings are mounted around welded metallic rings around the metal pipe;

FIG. 21, an end elevation of the split ring used in FIGS. 19 and 20;

FIG. 22, a longitudinal vertical section similar to that of FIG. 20, but showing a different gasket;

FIG. 23, a longitudinal vertical section of a coupling showing the coupled pipe end sections as end shanks for attachment to flexible hose or pipe;

FIG. 24, a perspective view of the coupling of FIGS. 15, 16, and 17;

FIG. 25, an end elevation similar to that of FIG. 15, but showing an insert or bridge that can also be used;

FIG. 26, a perspective view of a lever jaw as used in the couplings of FIGS. 7B, 8, and 9;

FIG. 27, a perspective view of a lever jaw as used in the coupling of FIG. 7B;

FIG. 28, a perspective view of a non-camming flat jaw as used in the coupling of FIG. 8;

FIG. 29, a perspective view of a camming flat jaw as used in the coupling of FIG. 9; and FIG. 30, an end elevation of the coupling of FIG. 8, showing the non-camming flat jaw in pipe releasing position.

DETAILED DESCRIPTION OF THE ILLUSTRATED EMBODIMENT

All the drawings can be studied together. Whether the coupling is one ended (having inner groove G1 and lever jaw members J only in one end portion of the coupling body with invented means to couple pipe) or two ended (where the coupling has inner grooves G1 and G2 and lever jaw members J in both end portions of the coupling body with invented means to couple pipe) the mechanical means, such as the lever jaw members and/or the flat jaw members which are employed to engage the coupling with the pipe, remain the same. For different requirements, and for cost effectiveness, different types of gaskets are shown in the drawings. Therefore, more than one type of gasket may be depicted on any given pipe section illustration. It is pointed out that drawings are not to any particular scale. It is further pointed out that because of the simplicity of the drawings, if any element (such as a lever jaw or the bolt used to lock the lever jaw in place) is used more than once in the design, that element will usually be depicted by the same numbers and alphabets in the same drawing and in all other drawings as well.

First, the coupling for grooved end pipe, FIGS. 1 to 5, will be explained simultaneously. FIGS. 1 and 2 are the same, except that FIG. 2 shows the relative positions of weight and power arms with respect to each other. As shown in FIG. 1, the coupling has body C with outer diameter C1 and inner diameter C2. The depth of the inner groove G1, which is used to accommodate lever jaws J, is depicted by the height between inner diameters C2 of the coupling body and groove diameter 31. The coupling body C is shown to engage pipe 14 with inner and outer diameters 20 and 21 respectively. The two ends of lever J are shown by J1 and J2. Concentric with the coupling, an arcuate portion J4, of lever jaw J, is delineated by J2, J6 and J7. J4 is concentric with the coupling body, with the pipe, with the inner groove in the body of the coupling, and with the groove in the outer surface of the pipe. The section between J7 and J9 diverges from said arcuate section J4, by making an interior angle at J7 with J4, outward and away from the center of the coupling to the fulcrum and integral axle J3 of the lever jaw. The power arm J8 shown in FIGS. 2 (in broken lines), 3, and 5 between J3 and J12, exits out of the coupling by making an offset interior angle with the weight arm at J9. The weight arm J5 and the power arm J8 are kept apart by means of circular stem J15 shown in FIG. 3. The power arm J8 preferably a is replica of the weight arm J5. The section between the power arm between J11 and J18 (shown in FIG. 3) diverges from the arcuate section J8 by making an interior angle at J11 with J8. Lever jaw J is held in position to coupling body C by means of a fulcrum integral axle, one end of which, J3, is inserted into a receiving hole located in a cut or recessed end portion of the coupling body delineated by cut sides 32, 33, and 34, where groove G1 is also interrupted. The power arm J8, between J3 and J12, rotates the weight arm from J3 to J2, about the fulcrum formed by J3. The portion of lever jaw J4, between J2 and J6, is designed to engage the groove of the pipe. The groove on the end portion of the pipe is indicated by 22. As seen in FIGS. 3 and 5, the axle mounting lever jaw J extends from the end of the coupling body and is supported in the coupling body only at the one end J3 indicated in FIGS. 3 and 5.

As shown and explained so far, the axle mounting and separating the power and weight arms, and having shaft mounting end J3 extending therefrom for mounting in a receiving hole in the end of the coupling body, is an integral part of the lever arms and shaft end J3 is rotatably received in the mounting hole. However, any mounting of the power and weight arms so that they move together and are pivotally mounted to the end of the coupling body can be used. For example, an alternative design is to mount the power and weight arms on a stem, such as a square stem, so that they rotate together, and run a bolt through the stem to screw into the receiving hole in the end of the coupling body. The stem can then rotate on and in relation to the mounting bolt. By removing the bolt, the jaws can be removed from the coupling.

With the stem, which can also be a polygonal or other shape other than a square which will prevent rotation of the power and weight arms in relation to the stem, the power arm and the weight arm can each be removably positioned on the stem, or the weight arm can be secured to the stem and just the power arm be removable. The head of the bolt mounting the stem will hold the arms in position on the stem. Alternately, the head of the bolt can be small enough to hold the stem in position, but allow the power arm to be removably placed on the stem when desired to move the weight arm and removed after moving the weight arm. Thus, the power arm can be positioned on the stem to rotate the stem and weight arm into engagement with the pipe end portion received in the coupling and then the power arm removed to leave the weight arm engaging the pipe end portion and the pipe end portioned secured in the coupling. The power arm can then be repositioned on the stem to rotate the weight arm out of engagement with the pipe end portion received in the coupling when it is desired to release the pipe from the coupling. Rather than the power arm taking the form of an arm as shown, the power arm can take the form of a wrench placed on the stem when desired to rotate the stem and the weight arm.

Optional radial bolts may be provided to secure the power arms J8 against the pipe, but the power arms may be locked in place by friction fit of the power arms J8 against the outer faces F1 and F2 of the coupling body. Rather than merely a friction fit, a spring loaded ball bearing or similar item on the power arm or the coupling body face may be used to enter a detent in the coupling body face or the power arm to hold the power arm in place. Alternatively, secure locking of the lever arms may be accomplished by securing a locking bolt n1 extending through the power arm of the lever with a hole therethrough which, when the arms are in position to secure the pipe in the coupling, aligns with a hole through the end of the coupling body extending into the groove in the coupling. The bolt n1 is inserted through the hole in the power arm and through the aligned hole in the coupling body to extend over lever jaw J and hold the weight arm and power arm in locked position as shown in FIG. 2. In low pressure pipes or hoses where frequent engaging and disengaging of the coupling is required, only one lever jaw J will be provided in the coupling. It is further pointed out that if high pressure in the pipe line requires the use of more than one or two lever jaws, then more than one or two lever jaws J will be provided for the coupling. The two pipes being connected in the Figures are shown by 14 and 14A; their outer diameters are depicted by 21 and 21A.

The mechanical means of lever jaw J has already been explained under FIGS. 1, 2, and 3. Therefore, they will not be discussed again unless the need arises, and only new elements in each Figure will be explained. In all of the drawings, the body of each coupling is shown by C, its outer diameter is shown by C1, and its inner diameter by C2. The length of each coupling between its outer opposite ends, is indicated by F1 and F2. Outer faces F1 and F2 also provide the outer walls 27 and 27A for grooves G1 and G2 respectively.

FIGS. 3 and 5 show a two ended coupling and FIG. 4 shows a one ended coupling. In FIG. 4 the one ended coupling is integrated either with a traditional pipe or with a hose shank. Whichever the case, the pipe or hose shank is shown by 14A.

To make coupling easily understood, the coupling in FIG. 3 is shown without any pipe. The coupling of FIG. 5 shows the coupling joining two pipes together in end-to-end relationship. FIG. 3 depicts a longitudinal vertical section taken on line 2-2 of FIG. 2. All the elements of FIG. 3 have been discussed with FIGS. 1 and 2.

The one ended coupling of FIG. 4 employs, as an example, a diaphragm type of gasket seal. Diaphragm seal 1 is provided with openings 12 and 12A to pressurize the seal with fluid in the pipe line. The outer surface 21 of pipe 14 provides a seat for gasket 1. Through cavity 19 and openings 12 and 12A, fluid reaches internal cavities 13 and 13A, and pressurizes diaphragm seal 1, thus blocking the exit of fluid between 14 and 11. The lever jaws with their weight and power arms are not shown in FIG. 4. FIG. 4 shows clearly groove G1 for the lever jaw weight arm in coupling body C, and the groove 22 in the end portion of pipe 14. Alternately, groove 22 could be constructed in a ring welded to the end portion of pipe 14.

FIG. 5 shows the two ended coupling of FIG. 3 holding two pipes 14 and 14A together in end-to-end relationship. It also shows two seal gaskets mounted over rings, which rings may be welded to the ends of the pipes or mounted around the end portions of pipes. The power arms J8 are held in place against the end faces F1 and F2 by means of a frictional fit or by means of frictional depressions provided in said faces F1 and F2. The triangular seals 47 and 47A depicted by their sides 50, 51, 52 and 50A, 51A, 52A, respectively, are mounted in corresponding triangular grooves. The seal may be a solid seal or it may be provided with a hollow interior which can be energized by the fluid in the pipe line. The fluid in cavities 53 and 53A exert pressure outwardly toward the coupling body and the fluid provided by the gap G pushes the seals outward parallel to the axis of the pipe. Thus, the resultant force is such that it seals the fluid. The power jaws J8 (shown in FIG. 2) can be pried out by pushing a tool between the arm J8 and pipe. It should be understood that seals 47 and 47A can alternately be "O" ring seals placed in conventional rectangular grooves or various other types of seals.

The couplings of FIGS. 6-9 are similar to the coupling of FIGS. 1, 2, and 3. However, the ends of the coupling body have a different configuration as does one longitudinal side of the coupling body as shown in FIGS. 6-9. As previously described, the coupling body C of FIGS. 1-5 has a central pipe receiving opening defined by coupling inside diameter C2 to receive therein the end portions of pipes to be coupled. The coupling body, as shown in FIG. 3, has flat ends defined at the left end by flat outer face F1 and at the right end by flat outer face F2. Internal grooves G1 and G2 in the coupling body extend circumferentially substantially completely around the central pipe receiving opening interrupted only by the small recessed end portion delineated by cut sides 32, 33, and 34 through which the lever jaw axle extends. In the embodiments of FIGS. 6-9, the configuration of the ends of the coupling body are modified by extending the grooves G1 and/or G2 only partially around the pipe receiving opening and enlarging the recessed end portions to recess the remainder of the end faces to eliminate the grooves in such recessed end portions. As shown, approximately half (one hundred and eighty degrees) of the grooved portion of the coupling end, between longitudinal faces or steps 32A and 34A, is eliminated. This results in a stepped configuration of the coupling ends. Thus, as shown in FIGS. 6-9, the portion of the coupling body end that includes the groove G1 extends to the outer face F1, while the portion of the coupling body end that eliminates the groove G1 only extends to the face F3 which, in the portion of the coupling body end with groove G1, defines the inner side of groove G1. The portion of the coupling body end without the groove can be referred to as a recessed end portion while the portion of the coupling body end having the groove therein can be referred to as the grooved end portion or as a step end portion. Groove G1 opens through steps 32A and 34A to outside the coupling body. The removal of part of the coupling body ends reduces the weight of the coupling body. It also allows for various changes in the configuration of and operation of the jaw members, which will be described. Further, the grooved end portion which forms the step, if arranged in the coupling installation at the lower side of the coupling body as shown in FIG. 7A, provides a resting surface upon which a pipe end to be inserted into the pipe receiving opening in the coupling body can be rested in preparation for insertion into the pipe receiving opening. In addition, when inserting the pipe end into the coupling body, the open ends of the groove in the grooved end portion, i.e., where the groove opens through faces 32A and 34A, are visible and the pipe groove can be more easily aligned with the coupling groove than when the coupling groove is entirely hidden in the coupling body.

Another difference in the coupling body as shown in FIGS. 6-9 from the coupling body of FIGS. 1, 2, and 3 is the thinning of the coupling body along a portion of the recessed end portions. This thinning of the coupling body is done to further reduce the weight of the coupling body and can be done because of the elimination of part of the grooved end portion of the coupling body. Because the coupling body no longer has to be thick enough through the recessed end portion of the coupling body to form a groove, the extra thickness necessary to form the groove can be removed. Thus, as shown in FIGS. 6-9, a section of the coupling body along a portion of the recessed end portions extending between faces 32B and 34B has been thinned. This thinned section extends along the longitudinal or axial length of the coupling body. Care needs to be taken in thinning this section that enough thickness remains to provide the necessary strength to hold the pipe ends in the coupling and withstand any stresses that may be expected between pipe ends. However, this necessary thickness is generally substantially less than the thickness needed to provide the grooves.

With the provision of the recessed end portion of the coupling body, various changes in the configuration of and operation of the jaw members can be made. For example, as shown in FIG. 7A, the jaw members of the coupling can be placed in mutually reversed positions next to each other. FIG. 7A, similarly to the sets of lever jaw members of FIGS. 1, 2, and 3, shows the power arm J8 offset from weight arm J5 by stem J15, FIGS. 1, 2, and 3, which is part of the fulcrum integral axle to which the power and weight arms are secured. Axle end J3 extends into coupling body C to pivotally mount power arm J8 and weight arm J5 to coupling body C. Weight arm J5 is positioned in coupling interior groove G1. Thus, as power arm J8 is rotated about the fulcrum, created by axle end J3, toward the center of coupling body C, weight arm J5 also rotates toward the center of coupling body C. If a pipe end is received in coupling body C, weight arm J5 rotates into the groove in the end portion of the pipe, or if the end of the pipe is not grooved, weight arm J5 rotates into position against the outer surface of the received pipe. If the pipe is not grooved to receive the weight arm, the weight arm usually will have to be pressed against the pipe surface, such as with a screw or by other means, to be able to hold the pipe in the coupling body. If the pipe is grooved, the screw n1 with head n shown in FIGS. 2 and 7A can be used to lock the set of lever arms in the engaged position as shown in FIG. 2. As can be seen, power arm J8 is angularly offset from weight arm J5 so that weight arm J5 will rotate into position in a pipe groove before further inward movement of power arm J8 is blocked by the received pipe.

FIG. 6 shows a standardized basic coupling body C with outer surface C1 and inner diameter C2 that can be used in various embodiments of couplings of the invention. The inner grooves G1 and G2 between steps 32A and 34A may extend between ¼, to ¾, circular length around the circumference of the pipe end portion receiving opening in the coupling body. In case of very low pressures a single jaw is usually sufficient for coupling connection. For other pressures, two jaws will be used. The basic standardized system of openings or holes in the coupling body ends is shown by holes H2,H3, H6, H7. Holes H6 and H7 may be provided with or without threads, depending on whether bolts or pins are used. Holes H2 are provided to mount an end of the lever jaw axles to the coupling body C. Holes H3 are provided to lock lever jaws, arcuate flat camming jaws, and arcuate flat non-camming jaws as shown in FIGS. 26,27,28,29 and 30 in position in the coupling. Holes H6 are used for both arcuate camming and non-camming flat plate jaws. Holes H6 and H7 are used for camming jaws and also can be used to lock lever jaws of larger size of pipe. Thus, with any combination of jaws a customer buys from the manufacturer he gets the same coupling body with the same system of holes. Thus, it becomes economical to produce the same coupling body for various combinations of jaws, single jaws, or sets of a single type of jaws. The coupling body between steps 32B and 34B is preferably thinned to reduce the weight of the coupling body. The two outer faces of coupling body C are shown by F1 and F2.

FIG. 7B is a perspective view of a coupling of the invention made by mounting lever jaws as shown in FIGS. 26 and 27 to the standardized coupling body. Thumb easing lever jaw, drive E1 is designed to allow a user to use his or her thumbs to rotate the lever about pin or bolt P1. Pin or bolt P1 is mounted in holes H1, FIG. 7B, and extends into hole H2 in the coupling body as shown in FIG. 6. Bolt B3 is mounted through threaded hole H4 in the jaw and extends into hole H3 in the coupling body to lock lever J in place. It is pointed out here that for some applications, a spring loaded ball bearing locking system can be provided in jaw E to cooperate with hole H4 to hold jaw E in position. The inner portion of E1 in slidable contact with the face F1 or F2 of the coupling body is depicted by E2.

FIG. 8 shows a coupling of the invention made by mounting a lever jaw as shown in FIG. 26 in the right side of the coupling as lever jaw J of FIG. 8, and sliding a non-camming flat jaw as shown in FIG. 28 in the left side of the coupling of F*ig*.8 as jaw V. Lever jaw J is pivotally mounted to coupling body C by pin or bolt P1 extending through an end of lever jaw J and into right side receiving hole H2 in coupling body C. Lever jaw J is shown in pipe holding position rotated inwardly toward the center of the pipe receiving opening and is shown locked in this position by non-camming jaw V. Vertical end section V5 of jaw V, shown in FIG. 28, at V3, FIG. 8, is positioned against end J2 of lever jaw J and extension V6 with end V7 of non-camming jaw V over laps end portion J2 of jaw J to lock it in place. Thus, the need of mounting any bolt through hole H4 in lever jaw J can be eliminated or hole H4 in jaw J can be eliminated as well. Jaw V is provided with groove 54 positioned so that holes H6 and H7 are centered over groove 54. A pin or bolt b1 is inserted through opening H6 and through groove 54 to prevent jaw V from being completely pulled out of the coupling body when moved to pipe releasing position. As shown in FIG. 30, jaw V can be partially rotated around pin or bolt b1 in this position to release a pipe from the coupling. Bolt B1 is mounted in opening H4 in jaw V. When in extended position as shown in FIG. 28, bolt B1 can be used as a handle for sliding jaw V. Jaw V can be locked in inserted, pipe holding position in the coupling by screwing bolt B1 into hole H3 shown in FIG. 6.

FIG. 9 shows a coupling of the invention made by mounting a lever jaw as shown in FIG. 26 in the right side of the coupling as lever jaw J of FIG. 9, and sliding a camming flat jaw as shown in FIG. 29 in the left side of the coupling of FIG. 9 as jaw j. Lever jaw J is pivotally mounted to coupling body C by pin or bolt P1 extending through an end of lever jaw J and into right side receiving hole H2 in coupling body C. Lever jaw J is shown in pipe holding position rotated inwardly toward the center of the pipe receiving opening and is shown locked in place by camming jaw j. Jaw j vertical section V5, is positioned against end J2 of lever jaw J and extension V6 with end V7 over laps end portion J2 of lever jaw J to lock it in place. Thus, the need of mounting any bolt through hole H4 in lever jaw J can be eliminated or hole H4 in lever jaw J can be eliminated as well. Camming jaw j is provided with grooves g1 and g2 positioned so that holes H6 and H7 are centered over groove g1 and g2. A pin or bolt b1 is inserted through hole H6 and through groove g1 and pin or bolt b2 is inserted through hole H7 and groove g2 to provide camming of camming jaw j and to prevent jaw j from being pulled out of the coupling body. As will be apparent, sliding of camming jaw j in a counter clockwise direction in coupling body C around a pipe received in the coupling will move the camming jaw j inwardly toward the center of the coupling to pipe holding position, and sliding of camming jaw j in a clockwise direction in coupling body C around a pipe received in the coupling will move the camming jaw j outwardly from the center of the coupling to pipe release position. A thumb easing jaw drive may also be provided on the camming and non-camming jaws. In the embodiment of FIG. 9, the thumb easing jaw drive takes the form of an arcuate device depicted by numbers 52a, 52b, 52c, and 52d, is rotatably mounted to the exposed end of jaw j by bolt B1 mounted in hole H4 for allowing a user to slide camming jaw j in the coupling groove by use of the user's thumb. Said arcuate device can be partially rotated around bolt stem B1 to allow pressure to be applied by a user in each direction. Clockwise rotation of the arcuate device will be stopped by the reaction of end 52C against the pipe received in the coupling. By the push of the user's thumb at arcuate section 52a, said arcuate device along with camming jaw j is moved to pipe release position to clear camming jaw edge J4 from the groove of the pipe. To move camming jaw j into pipe holding position, said arcuate device is rotated counter clockwise and thumb force is applied against section 52b. When camming jaw j is in pipe holding position, portion B4, FIG. 29, of pin or bolt B1 can be pushed into hole H3 of the coupling body to lock camming jaw j in its pipe locking position.

To connect the coupling of FIGS. 8 or 9 to a pipe, both jaws are moved to pipe release position and the end portion of a pipe to be connected is inserted into the pipe receiving opening in the coupling. The lever jaw on the right side of the coupling is rotated into pipe holding position. The camming or non-camming flat jaw is then moved into pipe holding position around the received pipe to hold the pipe and to lock the lever jaw in pipe holding position. To disconnect the coupling from the pipe, the reverse order is followed, first moving the flat jaw to pipe release position which also unlocks the lever jaw so it can then be rotated to pipe release position.

FIGS. 10 and 11 can be studied together. FIG. 10 shows that while one end of the coupling is provided with at least one lever jaw with power arm, the other end of the coupling can be provided with at least one camming jaw or two camming jaws. FIG. 10 shows the end of the coupling provided with two camming jaws depicted by j. The camming jaws j are mounted in housing groove G1 which has outer wall F1 and roof depicted by 36 having inner and outer surfaces 31 and 37, respectively. FIG. 10 depicts a transverse vertical section taken through said housing passing through camming grooves g1 and g2 in the body of the two jaws depicted by j. The arcuate length of each jaw is shown between j1 and j2. Each jaws j is movably held inside of G1 by means of frictional pins b1 and b2 driven through wall F1. Pins b1 and b2 can be bolts as well as driven through F1 into camming grooves g1 and g2. Radial flange h is welded to the end of j1 of j or that flange is constructed integrally with j. Welding is shown by W. Opening h1 is provided in flange h. A locking bolt b3, FIG. 11, is passed through opening h1 and its threaded end b4 lockingly can be driven into the coupling body C. Unlike the "U" jaws in the inventor's coupling in his U.S. Pat. No. 5,387,017; each arcuate flat jaw is moved separately in the opposite direction. Movement of the jaw in one direction by means of flange h moves the jaw out of the pipe groove 22 to free the coupling from pipe 14, and moving the jaw in the opposite direction lowers the jaw into the groove 22 to lock the coupling to pipe 14. By loosening bolt b3, each jaw j can be rotated around groove 22 by means of bolt handle b3.

FIG. 12 shows one end of the coupling provided with one lever jaw in combination with an arcuate flat plate jaw. The flat plate jaw is shown by V having inner and outer diameters V2 and V1 respectively. An arcuate length of the jaw V is depicted by V3 and V4. The end flange V4 is provided with an opening V5 for a bolt which can lockingly can be driven into coupling body C. The flat plate arcuate jaw V can be mounted once the lever jaw J has been locked in the groove of the pipe 14. Similarly V can be released from the groove of pipe 14 before or after the lever jaw J is unlocked from the groove of pipe 14. An alternative design to connect lever jaw J to power arm J8 and to mount the lever arms is also shown in FIG. 12. A square stem J15 is provided with a corresponding opening for a bolt B. Bolt B is mounted through square stem J15 and is screwed into the receiving hole in the end of the coupling body. The receiving hole is threaded to receive bolt B therein. Square stem J15 can rotate on and in relation to bolt B. Jaw J may be secured to stem J15 by welding or may be formed integrally with jaw J.

FIGS. 13 and 14 will be explained together. FIG. 13 shows the exploded assembly of a hose coupling with coupling body C having an integral shank 3a, connecting the coupling body C to the end of a hose. The coupling couples to a hose having a hose end shank 1a. The assembled coupling is shown in FIG. 14. For clarity, the jaws and openings in the coupling body C are not shown, however, they can be any of the arrangements already discussed. Shank 1a, of the hose end shank is provided with end ring 1b, which has outer diameter 1d, and a circular groove 1e. Coupling body C is provided with circular seat S3 for U type seal Z. Seal Z is mounted around seat S3 inside of the cavity between S3 and inner circular surface of coupling body C. The face of end portion If closes the seal on it's one side while the dead end of said cavity closes the seal on the opposite side. It is understood that any combination of jaws can be used in the coupling body to make the coupling. For very low pressures only one jaw may be needed.

FIGS. 15 to 17 and 24 can be studied together. FIG. 15 depicts an end of a coupling body similar to that of FIG. 8 where a portion of the end portion of the coupling body normally forming a half of the internal radial groove between 32A and 34A is removed, and the top portion of the coupling between C1 and C2 is thinned out for weight reduction of the coupling. The coupling of FIG. 15 is shown in perspective in FIG. 24. The power arm and the weight arm of the lever jaw J are integrated in the same plane as a monolithic lever jaw J as shown in FIG. 17. FIG. 17 shows lever jaw j delineated by its sides J1, J4, J2, J5, J21 and J20. The lever jaw J is depicted between its two ends J1 and J2 and between its inner and outer arcuate portions J4 and J5 in FIG. 15. The length of the arcuate portion between J1 and J2 preferably is a quarter circle. The side J32 preferably emerges as a tangent with J4 at a point J6. The imaginary radially extended side between J7 and J21 toward the center of the coupling will make a ninety degree angle with side J32. Side J20 preferably conforms to the outer interrupted diameter C1 of the coupling C. Each pin P1 extends into a receiving hole in the coupling body to pivotally mount a jaw J to the body of the coupling and also act as the fulcrum for the power and the weight arms of the lever jaw J. Pins P1 can also take the form of a screw or bolt threaded into the receiving hole. Pins P1 can rotate with lever jaw J or lever jaw J can rotate in relation to pin P1. If the pins are inserted into the hole in the coupling body to rotate therein, a pin P1 is inserted through opening H1, FIG. 17, in the lever arm or jaw J and is secured therein such as by a press fit or by welding. The end of the pin extending from the jaw J is inserted into coupling body receiving hole H2 shown in FIG. 16. The positioning of the jaw J in the coupling body groove will hold the jaw and pin in hole H1 during use. If pin P1 takes the form of a screw or bolt, hole H1 will be threaded to receive the screw or bolt which can either rotate in hole H1 as the jaw is moved between engaged and disengaged positions and/or jaw J can freely rotate about the screw or bolt.

Screws depicted by B1 are threaded through holes H4, FIG. 17, through jaws J into receiving holes H3, FIG. 16, in the body of coupling C to lock jaw J in engaged position inside a pipe groove of a pipe received in the coupling body. Receiving holes H3 may be threaded or unthreaded. By receding each screw B1 so it does not extend beyond jaw J into hole H3 in the coupling body, jaw J is free to rotate about pin P1. Screw B1 can then be used as a handle to rotate jaw J about pin P1 between engaged and disengaged positions. In this embodiment, screw B1 forms the end of the power arm which extends between pin P1, the fulcrum, and screw B1. The weight arm is the entire length of jaw J between pin P1 and jaw end J2. Additional locking screws B2 may be provided, if desired, to lock the jaw J in engaged position. A hole H5 extends through coupling body face F1, FIG. 15, into the internal groove and is aligned with a threaded hole H6, FIG. 16. With jaw J in engaged position, screw B2 is inserted through hole H5 and the internal groove and is threaded into hole H6 in the body of the coupling. Screw B2 will then lock jaw J in engaged position. Either hole H5 or hole H6, or both holes, are threaded. A tab or other handle can be provided in place of screw B1 to form the end of the power arm and allow manipulation of the lever jaw J between engaged and disengaged positions. In such case, screw B2 can be provided to lock the jaw J in engaged position.

FIG. 16 depicts a vertical section taken on the line 4-4 of FIG. 15. The outer walls of the internal grooves at two ends of the coupling body are shown by F1 and F2. The top narrow half portion of the coupling is shown between faces F3 and F4 and the thinned outer wall is shown at the top of FIG. 16 between C1 and C2. The thicker wall of the coupling which contains the internal grooves is shown at the bottom of FIG. 16 between C1 and C2. Hole H2 may be a through hole extending completely through the coupling body.

The coupling of FIGS. 15-17 provides an integrated power and weight arm forming jaw J which is easier and less expensive to manufacture than the separate power and weight arms assembled on a shaft to provide the sets of lever arm members for the embodiments of FIGS. 1-9. They are also lighter than the sets of lever jaw members. Also, the particular design of jaw J shown in FIGS. 15-17 provides a cap for the exposed open ends of the internal grooves of the coupling. Further, as previously mentioned, it has been found that with the portion of the end of the coupling body forming the internal groove cut away in the recessed portion to provide the internal groove over only about half of the coupling, i.e., over about one hundred eighty degrees, not only is weight reduced, but if the grooved portion of the coupling end is positioned at the lower side of the coupling, that grooved end portion of the coupling acts as a platform upon which a pipe to be inserted into the coupling body can rest in preparation for insertion into the coupling body.

FIG. 18 is a vertical longitudinal section of the coupling of FIG. 16 showing the two ends of the coupling and showing the coupling provided with two "U" type gasket seals g1 and g2. Gasket seals g1 and g2 are mounted against confronting slanted faces of two rings 1b, and 2b, provided in the front end portions of opposite ends of two pipes 1a, and 2a, received in the coupling body. In the embodiment of FIG. 18, rings 1b, and 2b, are provided with surfaces for welding the rings to the pipes. Thus, ring 1b, is welded to pipe 1a, with weld w1 and ring 2b, is welded to pipe 2a, with weld w2. Pipe 1a, provides seat s1 for the gasket g1, and ring 2b, provides seat s2 for gasket g2. Jaws J4 are shown at the bottom of FIG. 18 in engaged positions in grooves 1e, and 2e, of rings 1b, and 2b. Jaws J4 can be locked in these engaged positions in grooves 1e, and 2e, by screws B1 and/or B2 as previously described. Jaws J4 can be unlocked and rotated about pins P1 to their disengages positions out of grooves 1e, and 2e, to allow the pipes with rings 1b, and 2b, to be removed from the coupling. In disengaged position, the ends of jaws J4 as shown in grooves 1e, and 2e, at the bottom of FIG. 18 will be received entirely in the coupling internal groove.

FIGS. 19, 20 and 21 will be explained together. Rather than rings 1b, and 2b, which provide the pipe grooves 1e, and 2e, for cooperation with the jaws of the coupling being welded to pipes 1a, and 2a, as shown in FIG. 18, the rings are split into two arcuate halves A1 and A2, shown in FIG. 21. Thus, rings 1b, and 2b, each take the form of split rings which are placed over and secured to the ends of pipes to be coupled using the coupling of the invention. FIG. 19 shows additional split rings r1 and r2, preferably metallic, embedded into grooves m3 and m4 grooved around the end portion of each of pipes 1a, and 2a, to which rings 1b, and 2b, are to be attached. This embodiment is particularly useful with plastic pipes, such as PVC or polyethylene pipes, where rings r1 and r2 can be embedded in the end portions of the pipe. The halves of rings 1b, and 2b, are then placed and secured over the rings r1 and r2 by bolting two opposite sets of flanges f1 and f7 together by means of bolts shown by bolt heads f5, stem f6 and nuts f8, FIG. 21. Rings r1 and r2 are received in grooves m1 and m2 of rings 1b, and 2b,, respectively, to attach rings 1b, and 2b, to the pipe end portions. Rings r1 and r2 serve as stop rings to prevent rings 1b, and 2b, from sliding off the ends of the pipes 1a, and 2a, and either prevent relative sliding movement of the rings 1b, and 2b, with respect to pipes 1a, and 2a, or to allow limited sliding movement of the rings 1b, and 2b, with respect to pipes 1a, and 2a. The grooves m1 and m2 are preferably wider than rings r1 and r2. This allows limited sliding movement to accommodates thermal expansion of the pipes 1a, and 2a, by allowing rings r1 and r2 to slide longitudinally in receiving grooves m1 and m2 which allows pipes 1a, and 2a, to slide with respect to assembled rings 1b, and 2b. The rings can be mounted at the site of work or in the factory. The rings 1b, and 2b, and coupling body in FIG. 19 may be made of metals or of the same material as pipes, but the lever jaws J are preferably always made of metal. The split of rings 1b, and 2b, parallel to the axis of the pipe may be spot welded.

The front portions 1f, and 2f, of the rings 1b, and 2b, are sized and configured to be received inside the coupling body C in the same manner the ends of pipe are received in the coupling body. The rings 1b, and 2b, are engaged within the coupling body by the jaws J engaging grooves 1e, and 2e, as described. Stopper washers R also shown in FIG. 21 may be provided to restrict the movement of the coupling body C beyond points 1c, and 2c, of FIGS. 19, 20, and 22. Stopper washer R is shown at the right bottom ring connection in FIG. 19.

The embodiment of FIG. 20 is very similar to FIG. 19, the only difference is that the pipe in FIG. 20 is metallic pipe. The rings r1 and r2 are welded to the end portions of pipes 1a, and 2a, with weld w3 and w4. The mounting of the arcuate halves A1 and A2 of rings 1b, and 2b, around welded rings r1 and r2 is the same as discussed under FIG. 19. The function of grooves m1 and m2 is the same as in FIG. 19 to accommodate the thermal expansion of the metallic pipes 1a, and 2a. The split between A1 and A2 may be welded. The rings can be mounted at the site of work or in the factory.

FIGS. 19 and 20 both show two "U" type opposite seals mounted in front of the vertical faces of the opposite rings 1b, and 2b. These seal the coupling to prevent leakage of fluid flowing in the pipes at the coupling. FIG. 22 shows a single gasket Y rather than the two gaskets g1 and g2 of FIGS. 19 and 20. The single gasket has sides 1x, and 2x, which press against vertical faces of the opposite rings 1b, and 2b,, and the gasket opens toward the center of the coupling. Either the sloped faces of FIG. 18 or the vertical faces of FIGS. 19, 20, and 22 can be used in any of the embodiments with appropriate gaskets.

In FIG. 21, the outer and inner diameters of split ring 1b, are shown by 1d, and 1t. Preferably a rectangular stopper washer R will be provided to prevent the slippage of the coupling beyond points 1c, and 2c, during mounting and dismounting of the coupling and for that purpose, length of the rings 1b, and 2b, will be adjusted to the length of the coupling. Stopper washer R is also shown at the right bottom ring connection in FIG. 19.

FIG. 23 shows two hose end shanks 1a, and 2a, which substitute for the pipes 1a, and 2a, in the prior figures and to which the ring configuration of rings 1b, and 2b, are integrally molded. These shanks are attached in normal manner to flexible hose or pipe to form the properly sized and configured ends for use with the coupling of the invention. Such shanks could also be molded into molded plastic pipe to form the ends of such pipe.

The coupling of the invention is also suited for use with a flange, such as shown in pending U.S. application Ser. No. 10/446,302, which is secured, such as by welding, to the end of a pipe to provide the grooved, properly sized and configured pipe ends for use with the coupling of the invention, and to provide an advantageous sealing surface for confronting joined pipe ends within the coupling.

FIG. 25 shows the coupling embodiment of FIG. 15 with an additional insert or bridge z10 mounted over the reduced thickness section of coupling body C. When in the form of a bridge, the bridge will extend for the axial length of the coupling body and have two opposite sides wall z14, one at each end of the coupling body positioned in the recessed end portions of the coupling body, and each with an inner side wall edge z11. When the bridge is mounted, as shown, to the coupling body, side wall edges z11 extend into the grooves of the two opposite pipes being connected by the connector (pipes are not shown). Outer flanges z7 and z8 of the bridge are held in place by bolts z9. Alternately, pins could be used in place of bolts z9. Generally, a bridge will only be used for larger size couplings for larger size pipe, such as pipes of twenty four inch diameter or larger and where high pressures tending to pull the pipes apart can be expected. Generally also in installations with larger pipes, the coupling will be installed in the position depicted in FIG. 25 so that the grooved portion of the coupling end is at the bottom of the coupling installation and the bridge will be installed at the top of the coupling. This makes installation of the bridge relatively easy. The bridge can be secured to the coupling by a bolt extending through the bridge into the top of the coupling or into a threaded nut secured to the coupling such as in the position of z3 shown in FIG. 25, or in order to easily raise and lower the bridge to engage or disengage the pipe ends, a vise arrangement can be provided.

A vise arrangement is shown in FIG. 25 constructed of a threaded stem z3 extending through the bridge from attachment to the coupling body and a bolt z5 installed in a housing z1 secured to the outside of the bridge. Housing z1 is shown welded to the bridge with weld z2, and stem z3 is shown welded to coupling body C with weld z4. Outside of the housing z1 unthreaded nut z13 is connected to bolt z5 by means of a screw or a pin z12, or z5 and z13 can be welded together. When nut z13 is rotated counter clockwise, the bridge is raised upward away from the coupling body which raises the side walls z14 and the side wall edges z11 from the pipe grooves of the pipe end portions received in the coupling. This simultaneously frees the two connected pipes from the bridge's engagement. Clockwise rotation of nut z13 lowers the bridge toward the center of the coupling and simultaneously moves the side wall inner edges z11 of sides wall z14 into the grooves of the pipes to engage the pipes in the coupling. Alternately, rather than the side wall z14 themselves engaging the pipe grooves, flat jaws, like jaws V in FIG. 12, can be secured inside and against bridge side walls z14 to extend beyond the side wall edges z11 to extend into and engage the pipe grooves when the bridge is lowered. The flat jaws can be secured to the side walls z14 in any suitable manner such as by pins or screws extending through the side walls into the jaws. With such an arrangement, the flat jaws may hold the top portion of the pipes where they engage the pipe grooves more similarly to the way the jaw members J hold the lower portion of the pipes where they engage the pipe grooves to thereby provide more even holding pressure to the pipe grooves if desired for particular applications.

It is understood that one end of the invented coupling may have a different type of connection, such as a flange connection, a threaded connection, a ring connection, or any other type of jaw connection, to meet different requirements and conditions in making connections with pipes, hoses, pipe and hose fittings, and valves. For dead ends, the coupling is used as a one ended coupling which is provided with a blocking dead end plate. It is further understood that sizes, proportions, and shapes of the various components can vary and that the respective lengths of the lever arms can vary and can be shorter or longer than shown.

It should also be understood that the coupling of the invention can be modified and can be used in many applications not listed here. While the coupling of the invention has been described in connection with connecting pipes designed for fluid flow, the pipes can represent various other types of elements to be joined. Thus, the couplings can be used to connect other elements such as to connect structural pipes, beams, or rods. Structural elements can be structural elements of towers so the coupling of the invention can be used to couple towers such as electric or windmill towers to their bases. By providing a dead end on one side of the coupling the coupling can be used for fluid pressurized vessels, structural posts, beams, power or wind power towers, and other towers for other usages. The central bore of the coupling can be modified to any desired geometry and it does not need to be cylindrical.

The invented coupling has the distinct economical advantage of providing two couplings with the same coupling body, where two types of jaws can be used, alone or in combination, to meet the requirement and preference of the costumer. By using the standardized coupling body described, it is easy to provide any desired type of jaws or combination of jaws with the same coupling body.

This invented coupling has another distinct economical advantage in that it provides a coupling with combinations of flat plate camming jaws or plan flat plate jaws, where lever jaw can be locked into the groove of the pipe very quickly and the other types of jaws are locked in after locking the lever jaw with the groove of the pipe. Thus coupling has wider range to meet the requirement and preference of the costumer.

Whereas the invention has been described with respect to the presently preferred illustrated embodiments, it should be understood that various changes may be made in adapting the invention to different embodiments without departing from the broader inventive concepts disclosed herein and comprehended by the claims that follow.

I claim:

1. A coupling for attachment to the end portion of a pipe, comprising:
    a coupling body to closely receive the end portion of the pipe to be coupled therewith, said coupling body having an end with an end face with only a single pipe receiving opening therein into which the end portion of the pipe to be coupled is inserted and having a grooved end portion extending partially around the receiving opening with an internal groove therein and a recessed end portion extending partially around the opening and interrupting the internal groove, the end face of the coupling body being stepped and defined by both the grooved end portion and the recessed end portion; and
    at least one jaw member configured for movement in the internal groove in the grooved end portion to a position engaging the end portion of the pipe when the pipe is received in the coupling body to secure the end portion of the pipe in the coupling body.

2. A coupling for attachment to the end portion of a pipe according to claim 1, wherein the at least one jaw member received in the internal groove is a lever jaw member pivotally mounted to the coupling body by an axle extending from the coupling body in the recessed end portion, said axle forming a fulcrum for rotation of the lever jaw member about the fulcrum and the lever jaw member extending into the groove in the grooved end portion, rotation of the lever jaw member about the fulcrum moving the lever jaw member between an engaging position with respect to the end portion of the pipe when the pipe is received in the coupling body and a disengaging position with respect to the end portion of the pipe when the pipe is received in the coupling body allowing the end portion of the pipe to be removed from the coupling body or inserted into the coupling body.

3. A coupling for attachment to the end portion of a pipe according to claim 1, wherein the at least one jaw member configured for movement in the internal groove is movable along the internal groove circumferentially around the pipe received in the coupling body to a position securing the pipe in the coupling body.

4. A coupling for attachment to the end portion of a pipe according to claim 3, wherein the internal groove opens to outside the coupling body in the recessed end portion and wherein the at least one jaw member is removably slid into the internal groove to the position to secure the pipe received in the coupling body in the coupling body.

5. A coupling for attachment to the end portion of a pipe according to claim 3, including a lever jaw member also received in the internal groove and pivotally mounted to the coupling body by an axle extending from the coupling body in the recessed end portion, said axle forming a fulcrum for rotation of the lever jaw member about the fulcrum and the lever jaw member extending into the groove in the grooved end portion, rotation of the lever jaw member about the fulcrum moving the lever jaw member between an engaging position with respect to the end portion of the pipe when the pipe is received in the coupling body and a disengaging position with respect to the end portion of the pipe when the pipe is received in the coupling body so that the pipe can be removed from the coupling.

6. A coupling for attachment to the end portion of a pipe according to claim 5, wherein the jaw member configured for movement in the internal groove along the internal groove circumferentially around the pipe received in the coupling body is configured to lock the lever jaw member in pipe engaging position.

7. A coupling for attachment to the end portion of a pipe according to claim 5, wherein the coupling body includes two sets of a plurality of holes, the sets positioned on opposite sides of an end of the coupling body, the holes of each set being selectively used for mounting an axle which mounts a lever jaw member, for locking a lever jaw member in position with respect to the coupling body, for mounting a jaw member, and for locking a jaw member with respect to the coupling body, the positioning of one set being a mirror image of the positioning of the other set.

8. A coupling for attachment to the end portion of a pipe according to claim 1, wherein at least one of the at least one jaw members includes a hole therethrough to receive a locking bolt extending through the hole and into the coupling body when the at least one of the at least one jaw members is in a position to secure the pipe received in the coupling body in the coupling body.

9. A coupling for attachment to the end portion of a pipe according to claim 1, wherein the at least one jaw member configured for movement in the internal groove is movable along the internal groove circumferentially around the pipe received in the coupling body between a position spaced radially from the received pipe to allow the pipe to move into or out of the coupling body and a position securing the pipe in the coupling body.

10. A coupling for attachment to the end portion of a pipe according to claim 9, wherein the at least one jaw member includes a camming surface and is mounted in the internal groove so that the camming surface interacts with a mating camming pin secured in the groove.

11. A coupling for attachment to the end portion of a pipe according to claim 10, wherein the camming surface of the at least one jaw member is a camming slot in the at least one jaw member and the camming pin extends through the camming slot.

12. A coupling for attachment to the end portion of a pipe according to claim 1, additionally including a thumb easing jaw drive on the at least one lever jaw member to enable a user to rotate the at least one jaw member with the user's thumb.

13. A coupling for attachment to the end portion of a pipe according to claim 1, additionally including the pipe inserted into the coupling body, and wherein the end portion of the pipe inserted into the coupling body is formed by a ring attached to the end portion of the pipe, said ring having an internal opening, a front cylindrical outer ring surface of desired dimensions to closely fit into the coupling body, a front surface defining the front end of the ring extending between the internal opening and the front cylindrical outer ring surface configured for seating a selected gasket, a rear cylindrical outer ring surface, and a groove between the front and rear cylindrical surfaces sized and configured to receive the at least one jaw member of the coupling.

14. A coupling for attachment to the end portion of a pipe according to claim 1, wherein the coupling body includes two sets of a plurality of holes, the sets positioned on opposite sides of an end of the coupling body, the holes of each set being selectively used for mounting and locking jaw members to the coupling body, the positioning of one set being a mirror image of the positioning of the other set.

15. A coupling for attachment to the end portion of a pipe according to claim 1, wherein the coupling has opposite coupling body ends and joins two pipes in end to end relationship, each pipe having an end portion, wherein the coupling body is adapted to closely receive the end portion of each of the two pipes to be joined in end to end relationship, wherein the end of the coupling body with the pipe receiving opening is one of the opposite coupling body ends and the opening receives the end portion of the first of the pipes to be joined, and additionally including:

a second coupling body end forming the opposite coupling body end and having an end face, said second coupling body end having only a single second pipe receiving opening therein into which the end portion of the second of the two pipes to be joined is inserted and having a second grooved end portion extending partially around the second receiving opening with a second internal groove therein and a second recessed end portion extending partially around the second opening and interrupting the internal groove in the second grooved portion, the end face of the second end of the coupling body being stepped and defined by both the second grooved end portion and the second recessed end portion; and at least one second jaw member configured for movement in the internal groove in the second grooved end portion to a position engaging the end portion of the pipe when the pipe is received in the coupling body to secure the end portion of the second pipe in the coupling body.

* * * * *